United States Patent
Reget et al.

(10) Patent No.: US 10,393,510 B1
(45) Date of Patent: Aug. 27, 2019

(54) MEASURING APPARATUS AND METHOD FOR MEASURING FLEXIBLE ELONGATED PARTS

(71) Applicant: Innovatech, LLC, Chicago, IL (US)

(72) Inventors: Michael J. Reget, Lake Zurich, IL (US); Paul J. Margis, Bartlett, IL (US); Bruce Nesbitt, Chicago, IL (US)

(73) Assignee: Innovatech, LLC, Chicago, IL (US)

( * ) Notice: Subject to any disclaimer, the term of this patent is extended or adjusted under 35 U.S.C. 154(b) by 0 days.

(21) Appl. No.: 16/202,833

(22) Filed: Nov. 28, 2018

(51) Int. Cl.
*G01B 11/08* (2006.01)
*G01B 11/10* (2006.01)

(52) U.S. Cl.
CPC .............. *G01B 11/08* (2013.01); *G01B 11/10* (2013.01); *G01B 11/105* (2013.01)

(58) Field of Classification Search
CPC ....... G01B 11/00; G01B 11/02; G01B 11/022; G01B 11/024; G01B 11/026; G01B 11/028; G01B 11/04; G01B 11/043; G01B 11/046; G01B 11/06; G01B 11/0616; G01B 11/0683; G01B 11/0691; G01B 11/08; G01B 11/10; G01B 11/105
See application file for complete search history.

(56) References Cited

U.S. PATENT DOCUMENTS

| | | | |
|---|---|---|---|
| 2,058,518 A | 10/1936 | Schuster | |
| 3,739,183 A * | 6/1973 | Burton | G01B 11/02 250/559.26 |
| 4,097,849 A * | 6/1978 | Taylor | G05B 19/401 340/502 |
| 4,590,658 A | 5/1986 | Funyu et al. | |
| 4,655,596 A * | 4/1987 | Blessing | A41H 43/0271 356/615 |
| 4,970,401 A * | 11/1990 | Sadeh | G01B 11/02 250/559.31 |
| 5,348,208 A | 9/1994 | Tamura | |
| 5,414,648 A * | 5/1995 | Morgan | G01B 15/06 250/359.1 |
| 5,636,031 A * | 6/1997 | Passoni | G01B 11/024 348/130 |
| 5,670,067 A | 9/1997 | Koide et al. | |
| 6,832,577 B2 | 12/2004 | Nesbitt | |
| 7,191,929 B2 | 3/2007 | Nishimaki et al. | |
| 7,714,217 B2 | 5/2010 | Nesbitt | |
| 8,231,926 B2 | 7/2012 | Nesbitt | |

(Continued)

OTHER PUBLICATIONS

A New High Precision Micrometer System Brochure (20 pages) and supplemental enlarged pages (4 pages), Keyence Corp. of America, LS-9000 Series, 2014 (24 pages total).

*Primary Examiner* — Gordon J Stock, Jr.
(74) *Attorney, Agent, or Firm* — Neal, Gerber & Eisenberg LLP

(57) ABSTRACT

Various embodiments provide an elongated part measuring apparatus including an elongated frame, an elongated transparent part supporter supported by the frame and configured to support an elongated part (such as a guide wire or mandrel), an elongated movable part straightener pivotally connected to and supported by the frame, and a movable optical measurer movably connected to and supported by the frame and configured to take multiple spaced apart outer dimensional measurements of the elongated part (whether uncoated or coated).

34 Claims, 15 Drawing Sheets

(56) References Cited

U.S. PATENT DOCUMENTS

| | | |
|---|---|---|
| 9,091,527 B2 | 7/2015 | Kirst et al. |
| 10,001,366 B2 | 6/2018 | Matsumoto et al. |
| 2004/0184042 A1* | 9/2004 | Kobayashi ......... G01B 11/2433 356/638 |
| 2011/0079178 A1 | 4/2011 | Schramm et al. |
| 2018/0347962 A1* | 12/2018 | Zhao ..................... G01B 11/22 |

* cited by examiner

MEASURING APPARATUS AND METHOD FOR MEASURING FLEXIBLE ELONGATED PARTS

BACKGROUND

Various elongated parts such as but not limited to wires, mandrels, needles, and probes are widely known. During the manufacturing processes for such elongated parts, the outer circumferential dimensions (that are often 0.005 inches (0.127 mm) or smaller) of such parts often need to be measured during various stages of the manufacturing process.

In one example, wires (such as guide wires configured to enter the human body for various different types of medical procedures) often need to be measured during manufacturing processes as described below. Guide wires used in certain medical procedures are used as an example herein to explain certain problems with the measuring of various, elongated parts such as elongated parts having a fine or small outer diameter such as from 0.002 inches (0.0508 mm) to 0.038 (0.9652 mm) inches for different elongated parts or on the same elongated part, and are very flexible by design.

In another example, mandrels also often need to be measured during manufacturing processes. Various mandrels have a small outer diameter such as much as 0.0375 inches (0.9525 mm) (or even smaller outside diameters) and larger diameters up to about 0.500 inches (1.27 mm).

The lengths of guide wires used for medical procedures typically vary from about 4 feet (about 1.2 meters) to about 14 feet (about 4.2 meters), and can be even shorter or longer. Various types of guide wires are formed from solid cylindrical metal wires, often with multiple outer dimensions and tapers at a distal end. Various other types of guide wires are formed from metal coils that comprise very fine wire (e.g., such as having a 0.007 inch (0.1778 mm) outer diameter) is formed into the metal coils with outer diameters in the range of 0.012 inches (0.3048 mm) to 0.038 inches (0.9652 mm). These metal guide wires provide extreme flexibility while still providing sufficient rigidity. These metal guide wires are primarily made from stainless steel (but can also be made from nitinol or other alloys). Such metal guide wires typically need to be coated with a suitable coating to provide the guide wire with a bonded smooth outer polymer surface such as PTFE or an ablative hydrophilic surface to prevent injury to the intravascular system of the person in which the guide wire is inserted and to provide consistent tactile feedback to the surgeon or medical professional. For purposes of this disclosure, wires and guide wires are meant to include, but not be limited to, (1) single individual wires with a single or multiple outer diameter dimensions; (2) very fine wires that are formed into a coil that can have a single outer diameter dimension or multiple outer diameter dimensions (as well as solid wires often called mandrels); and/or (3) coiled guidewires that have rigid or semi-rigid metal, polymer, or "floppy tips" attached to the distal end of the guide wire (which can be comprised of different alloys, and/or polymer tips or combinations thereof).

Example known individual guide wires are coated with low friction, relatively inert coatings that include polytetrafluoroethylene ("PTFE") such as Chemours TEFLON® coating or Whitford XylaMed® coatings. Other example guide wire coatings include combinations of other fluoropolymers, such as fluorinated ethylene propylene ("FEP") and perfluoroalkoxy ("PFA"), which enhance certain characteristics of the finished coating and impart functional characteristics such as low friction, non-stick, and electrical and chemical resistance. Other example elongated parts are made of stainless steel (such as metal mandrels) and have a generally consistent outer diameter and are commonly coated with PTFE, FEP or PFA for nonstick purposes prior to being used to form an inside diameter of a flexible polymer tube through an extrusion process. Additional known coatings include hydrophilic coatings. All of these coatings are bonded to the original outer surface of the elongated part and add to the diametric outer dimension of the uncoated elongated part (such as the uncoated coiled or single dimension formed elongated wire).

Uncoated guide wires are typically manufactured by one company (i.e., a manufacturer) and sent to another company (i.e., a coater) that specializes in applying coatings to products such uncoated guide wires. Guide wire manufacturers require that the coating is applied to the uncoated guide wire within specific upper and lower dimensional tolerances or tolerance levels including specific outer diameters. Guide wire manufacturers also typically have minimum and maximum amounts of the coating that may be applied to any section of the guide wire. Guide wire manufacturers also sometimes require that portions of the guide wires be masked to provide the guide wires with distance markings from the proximal or distal end of the guide wire.

To meet these specific manufacturer requirements, a coater will often need to measure the outer diameter of the received uncoated guide wire before applying the coating. This can be done for each received uncoated guide wire of a batch of uncoated guide wires, or for a designated sample or quantity of the batch of uncoated guide wires. In other words, even before the coating is applied, the uncoated guide wires are often measured to establish and verify the actual outer diameters of the guide wires to be coated. A cleaning process is typically used prior to the measuring of the raw, uncoated wire. In certain instances, if an uncoated guide wire has one or more outer dimensions (along its length) below or above the particular outer dimension tolerances, the uncoated guide wire is not coated and is sent back to the guide wire manufacturer as not within specifications. In other instances, if an uncoated guide wire has too large of an outer diameter (along it length), the coater alerts the guide wire manufacturer of this fact and a decision is made whether to return the guide wire, to scrap the guide wire, or to apply a thinner coating (than specified to the guide wire provided that it meets the lower limit of the coating thickness, and so that the overall outer diameter (along the length) of that guide wire including the coating are under a certain upper limit for the outer diameter. For certain coating systems, the measurements of an uncoated guide wire are used to determine the amount of coating needed to apply to the uncoated guide wire to bring it within the required outer diameter tolerances of the guide wire and the coating to be applied, provided that the applied coating can be applied within the diametrical requirements of the coated wire. Many coatings must be applied to a maximum thickness which would preclude some of the additive coating to add to the dimension from increasing the diameter sufficiently.

Additionally, to meet the specific manufacturer requirements, a coater will also typically need to measure the outer diameters of the coated guide wires after applying the coating. This can be done for each coated guide wire of a batch of coated guide wires, or for a designated sample or quantity of the batch of coated guide wires. In other words, after the coating is applied, the coated guide wires are measured to ensure that the coated guide wires do not have any outer dimensions (along their length) below or above the particular outer dimension tolerances. In other words, the outer dimensions must not be below or above the particular outer dimension tolerances after being coated. If a coated guide wire is below or above the allowed outer dimension tolerance range, the coated guide wire is considered non-conforming and typically cannot be corrected (by adding to or reducing the coating thickness), and cannot be used for its intended purpose. More specifically, if the coated guide wire has too large of an outer diameter (along any portion of its length), the outer dimension often cannot be reduced to meet the desired specifications. Similarly, if the coated guide wire is too small after applying the coating, additional coating typically cannot be applied because the original coating has cured and additional layers of final cured PTFE coating cannot be applied because the coating, and particularly if the coating is PTFE, cannot generally have a second coat applied to a final cured PTFE first coating. Specifically, this is the case because the bond strength between the cured first layer and a second layer would be insufficient for a medical device (such as a guide wire) entering the human vascular system and could result in potential delamination between the surface of the first coat and the second outer coat.

This is also true for mandrels that are used in an industrial environment where a peeled or dislodged portion of coating would render the mandrel useless, and where the part that was formed over the mandrel would then have a contaminant inside it.

Additionally, certain guide wire manufacturers require a top coat to be placed over the primary coating layer which can be done with certain primary coatings, certain top coatings, and for certain coating processes. Thus, in some instances, the outer diameters of the guide wires need to be measured after the primary coating is applied and before the top coating is applied.

Additionally, to meet various manufacturer requirements, a coater may need to take into consideration that an uncoated guide wire may have different outer dimensions along its length. For example, an uncoated guide wire may be tapered from one end to the other end, generally referred to as the proximal and distal ends. A tapered guide wire typically has a smaller dimensional end that functions as a softer end (that is easier to manipulate or steer) for movement through the vascular or urinary system. For example, a guide wire may be reduced from 0.012 inches (0.3048 mm) to 0.004 inches (0.1016 mm) for about 12 inches (304.8 mm) at one end of the guide wire. These tapered guide wires need to be measured and have the taper verified. Thus, a coater will typically need to measure the outer diameter of the uncoated and the coated tapered guide wire at multiple spaced apart sections along the guide wire before and after applying the coating, respectively. Since the guide wires can be up to about 14 feet (about 4.2 meters) long, this includes taking numerous measurements of the sections of the guide wire along its length (such a measurement every 2 feet (about 0.61 meters) along the length of the guide wire).

In further instances, a guide wire manufacturer may require that one or more portions of the guide wire have no coating, exposing the uncoated stainless steel or metallic or polymer jacketed surface. These uncoated areas are typically used for distance referencing during a medical procedure. In certain such instances, the outer dimensions of the uncoated portions must be verified and documented. Because these uncoated areas are smaller than the coated areas, there is often a need to measure the location, with and/or placement of these uncoated areas.

Currently, the known process for measuring uncoated and coated elongated parts is time consuming and labor intensive and requires moving the elongated part (such as the guide wire or mandrel) through a measuring device. For example, this known process includes a worker manually moving the guide wire (whether before or after coating) to a measuring station, and then taking each of the measurements at each desired point along the length of the guide wire. This specifically includes the worker positioning the guide wire at a first desired point along the length of the guide wire and taking the measurement, and then moving the guide wire to repeat this process for each desired point of measurement along the length of the guide wire. For each such measurement along the length of the guide wire, the portion of the guide wire to be measured is positioned at a measuring station for that measurement. These multiple contacts of and physical manipulations of a coated guide wire can damage the coating or polymer sheath or covering on the guide wire (such as causing abrasions to or crushing or scratching of the coating on the guide wire). This is especially prevalent when the guide wire needs to be centered in a pair of Vee blocks, in an area for measurement. The various movements of and handling of the elongated part (such as a guide wire or mandrel) thus subjects the elongated part (such as the guide wire or mandrel) to potential damage. For a 14 foot (about 4.2 meters) long guide wire, this can include six or more separate measurements and six or more separate significant movements of the guide wire. It should be appreciated that certain fluoropolymer coatings such as PTFE, FEP and PFA or a hydrolytic coating that are applied to the outer diameter of a guide wire are relatively soft and compressible, and that such additional handling can damage such coatings.

In other examples, coating systems that use a handheld measuring device to obtain such measurements often result in inaccurate measurements because the jaws or anvils of the handheld measuring devices can deform or crush the coating on the guide wire as these devices must actually touch the surface of the wire/coating to provide a physical measurement.

In another known measuring method, a guide wire (or mandrel) is gripped at both ends and stretched tight on a reciprocating device that moves the guide wire in the measuring area of a laser micrometer. This requires actual physical gripping and holding, very tightly, of the guide wire, which particularly at the distal end, can be very, very delicate. In addition, as mentioned above, a guide wire formed from a coiled spring can be stretched and deformed by gripping it (i.e., by gripping both the distal and proximal ends and applying a force to straighten the guidewire between these two grip points). This stretching can cause inaccurate measurements of the outer dimensions.

It should also be appreciated that there are certain difficulties in holding these elongated flexible parts by the ends of the elongated parts.

In addition to guide wires that are configured to enter the human body, there are many other elongated parts that don't enter the human body such as mandrels (or forming mandrels). Certain of these mandrels form the inside of a rubber tube (such as a PEBAX rubber tuber or another flexible polymer tube). The rubber or polymer is typically extruded over the mandrel. The mandrel provides the rubber tube (or flexible polymer) with a precise inner diameter. These mandrels can be as long as 20 feet (about 6.10 meters) but are typically in the range of 6 to 10 feet (about 1.88 to 3.05 meters) long. These mandrels must be measured before use (i.e., before being coated with the rubber coating). Additionally, the outer diameters (along the length) of the elongated rubber tubes must also often be measured for compliance with manufacturer specifications.

Additionally, many finished guide wires are comprised of a flat or round coiled spring configuration with a welded nitinol tip and/or a jacketed nitinol or stainless steel tip attached to the coiled spring. These hybrid type guide wires, especially those coated with a hydrophilic coating at the distal end and a PTFE coating on the majority of the guide wire, can be subjected to excess handling that removes the hydrophilic coating (i.e., through digital handling and manipulation during the known measurement processes). Holding devices (such as Vee blocks) can actually remove or scrape the coating if the operator doesn't lift and replace the guide wire onto the holding devices (such as into the Vee blocks) rather than drag the guide wire through the holding device (such as the Vee blocks).

Accordingly, there is a need for a measuring apparatus and method that can be used to quickly and accurately measure multiple outer diameters of an elongated part (such as a wire or mandrel) at multiple points along the length of the uncoated or coated elongated part—without the significant amounts of manual movements (and labor) currently needed, without holding or stretching the elongated part between two points, without dragging the elongated part through holding devices (such as a pair of Vee blocks or alignment blocks), without applying undesired forces to the elongated part, and for enabling certain elongated parts (such as hybrid guide wires or any other guide wires) to "relax" while being measured, all in a significantly shorter time frame, and with accuracy measured in microns and without potential distortion, disruption, or abuse to the coating that is attached to the outer surface of the uncoated elongated part. Additionally, there is a need for a measuring apparatus that will measure the entirety of (including the absolute proximal and distal ends of) the elongated part (such as a guide wire or mandrel) without the need to hold the elongated part.

SUMMARY

The present disclosure provides a measuring apparatus and methods for quickly, easily, and consistently measuring the outer diameters of the entire uncoated or coated flexible elongated parts (at any suitable stage of manufacture or processing) for verification requirements for outer diametric measurements, and particularly for uncoated or coated wires (including but not limited to fine flexible tapered or non-tapered single or multi-dimensional wires such as guide wires), hybrid guide wires, whether jacketed or not, mandrels, probes, and solid and tubular needles.

Various embodiments of the present disclosure provide a measuring apparatus and method that can be used to quickly and accurately measure multiple outer diameters of an elongated part at multiple points along the length of the uncoated or coated elongated part—without significant amounts of manual movements (and labor), without holding or stretching the elongated part between two points, without dragging the elongated part through holding devices, without applying undesired forces to the elongated part, and for enabling certain elongated parts to "relax" while being measured, all in a significantly short time frame, and with accuracy measured in microns and without potential distortion, disruption, or abuse to the coated part or coating that is attached to the outer surface of the uncoated elongated part.

Various embodiments of the present disclosure provides a measuring apparatus and methods that can be used to quickly and accurately measure multiple outer diameters of the entirety of the elongated part (including the absolute proximal and distal ends of) the elongated part without the need to hold the elongated part.

Various embodiments of the present disclosure provides a measuring apparatus and methods that can be used to quickly and accurately measure multiple outer diameters of the entirety of the elongated part wherein gravity is the only force that acts on the part when the measurements are actually taken.

Various embodiments of the present disclosure provide a measuring apparatus and method that enables the operator to select the portions along the length of the elongated part (including absolute proximal and distal ends of the elongated part) to be measured and includes an operator notification system and recording of measurement system for notifying the operator of each such measurement, recording such measurements, and enabling any measurements that are outside of required specifications to be quickly determined and addressed.

Various example embodiments of the measuring apparatus of the present disclosure include: (1) an elongated frame; (2) an elongated transparent part supporter supported by the frame; (3) an optical measurer movably connected to the frame, positioned adjacent to and movable parallel (in most cases) to the part supporter, movable with respect to the part supporter, and configured to take multiple measurements along the length of an elongated part positioned on the part supporter; (4) one or more output devices such as one or more visual display devices and one or more sound producing warning or notification devices supported by the frame; and (5) a controller.

In various example embodiments of the present apparatus and method, the optical measurer is in the form of a high precision high speed LED optical micrometer such as one of the LS-9000 series optical micrometers manufactured by Keyence Corporation. It should be appreciated that other suitable or comparable devices can be employed to take the measurements as described herein.

In various embodiments, the controller: (1) causes the optical measurer to take measurements of the outer dimensions of designated portions of the elongated part along the entire length of the elongated part (including the proximal and distal ends) as the elongated part remains stationary on the part supporter as measured, generally, from the proximal end to the distal end; (2) receives data representing the measurements from the optical measurer of the outer dimensions of the elongated part; (3) causes the display device to display the determined outer dimensions of the elongated part to an operator; and (4) causes the sound producing device to provide any needed suitable alerts or alarms to the operator regarding any measurements of the elongated part that do not meet required specifications for that elongated part. In various embodiments, the controller determines the outer dimensions of the uncoated or coated part based on signals from the optical measurer, and in other embodiments, the optical measurer determines the outer dimensions of the uncoated or coated part and sends data representing those determined outer dimensions to the controller.

In various embodiments, the optical measurer operates in a continuous manner from one end of the elongated frame to the other end of the elongated frame to take continuous measurements of the elongated part. In various other embodiments, the optical measurer operates on an intermittent basis from one end of the elongated frame to the other end of the elongated frame to take intermittent measurements of the elongated part.

In various example embodiments, the optical measurer is movably secured to the frame and includes a light generator (such as a such as part of an optical micrometer) and a light receiver (such as a part of an optical micrometer). In various embodiments, the light generator and light receiver are each mounted in respective protective housings that are each attached to a movable arm that is moveable on a suitable track such as a precision track (not shown). The light generator generates a continuous or intermittent light beam (such as light micrometer beam) that includes a plurality of rays that are projectable onto the elongated part that extends on the elongated transparent part supporter. The transparent part supporter enables the rays of light beam to pass through the part supporter while still supporting the elongated part (such as a guide wire or a mandrel). Certain portions of the light beam (i.e., certain rays of the light beam) pass by the elongated part (such as the guide wire or mandrel) and are received by the light receiver. Other portions of the light beam (i.e., certain rays) are blocked (somewhat like an eclipse of the sun) by the elongated part and are not received by the light receiver. The light receiver generates electrical signals based on the received portions of the light beam. The signals are communicated to a controller that is programmed to calculate the measurements of the outer dimensions of the elongated part (such as the guide wire or the mandrel) based on which light rays are received by the light receiver (and thus which light rays are blocked). The measurement data is communicated to a display device and displayed to an operator. In various embodiments, the operator may choose the type of information that is displayed by the display device, such as the upper and lower dimension tolerance levels for the elongated part being measured, and may specify a written report based on dimensional data accumulated by the measuring apparatus.

The measuring apparatus thus enables an elongated part to be placed on the elongated transparent part supporter, and totally eliminates the undesired manipulations of the elongated part during the measurement process once the elongated part is positioned and straightened or aligned on the part supporter, and obtains individual, spaced apart outer dimensional measurements at designated areas predetermined along the length of the elongated part (which can includes any of the areas from tip to tip). In various embodiments, the only force acting on or affecting the elongated part is gravity. In various embodiments, the present disclosure also contemplates that the elongated part can have a curve or less than an exact linear placement on the transparent part supporter (in part because the width of the optical micrometer is sufficient to pick up a deviation from the center line of the part supporter).

In various embodiments, the measuring apparatus also provides a single straightening process for the elongated part which eliminates the need for multiple straightening processes, provides for an extremely straight part prior to measurement, and provides for measurements of the absolute tip and tail or proximal and distal ends In various embodiments, the measuring apparatus of the present disclosure is configured to take accurate measurements of an elongated part such as a flimsy, very mechanically delicate, and long guide wire (which can be as thin as or thinner than a human hair) while substantially reducing (or practically totally eliminating) multiple manipulations of the elongated part, once it is placed on the transparent part supporter during the entire measurement process and potential damage to the elongated part and to the coating on the elongated part that can occur (such as possible damages to the primary or top coatings), and while only allowing gravitational forces to act on the elongated part during the actual measurement process.

Additional features and advantages of the present disclosure are described in and will be apparent from the following Figures and Detailed Description.

DETAILED DESCRIPTION

Figure 1:
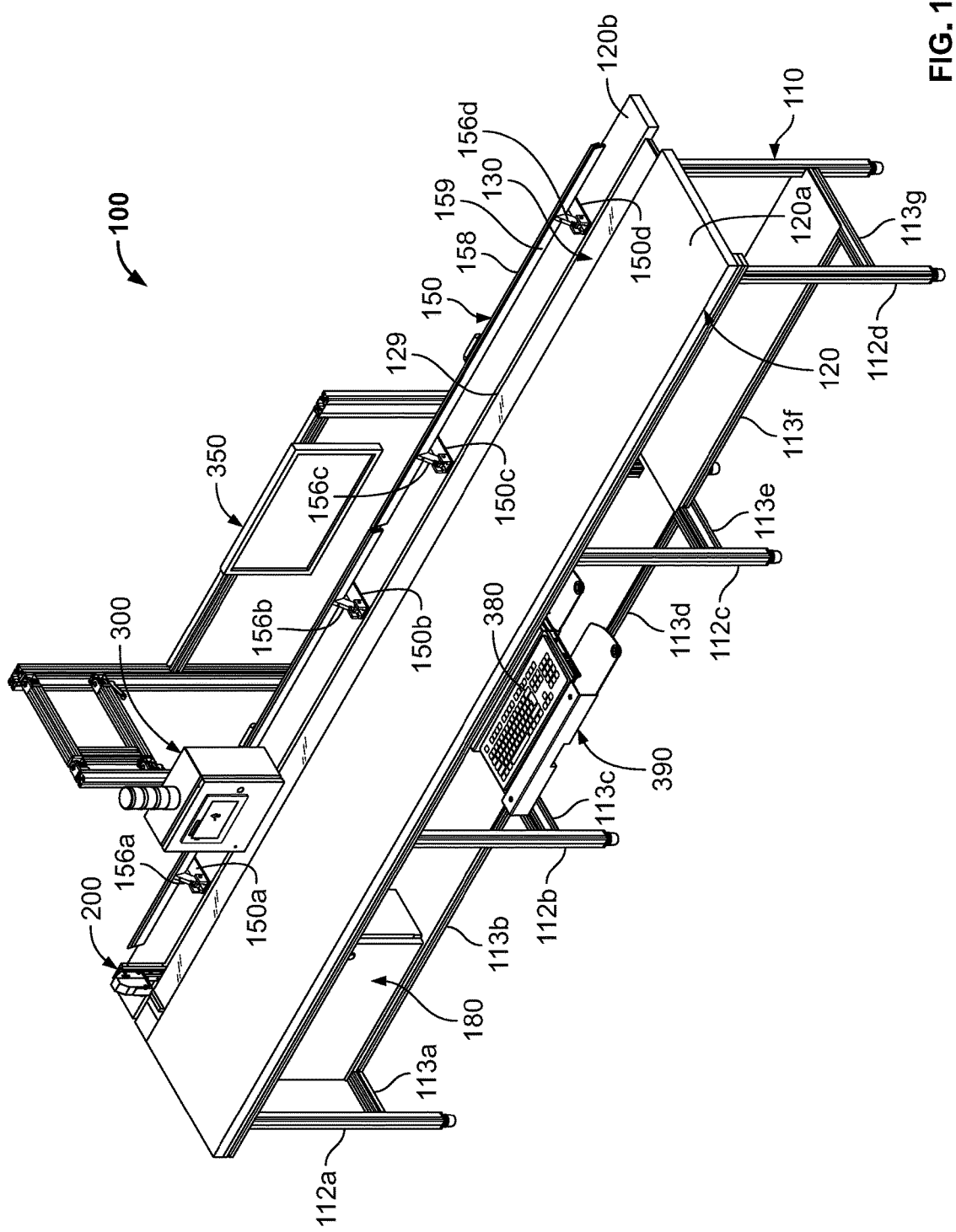
FIG. 1 is a top front perspective view of one example embodiment of the measuring apparatus of the present disclosure.
Figure 2:
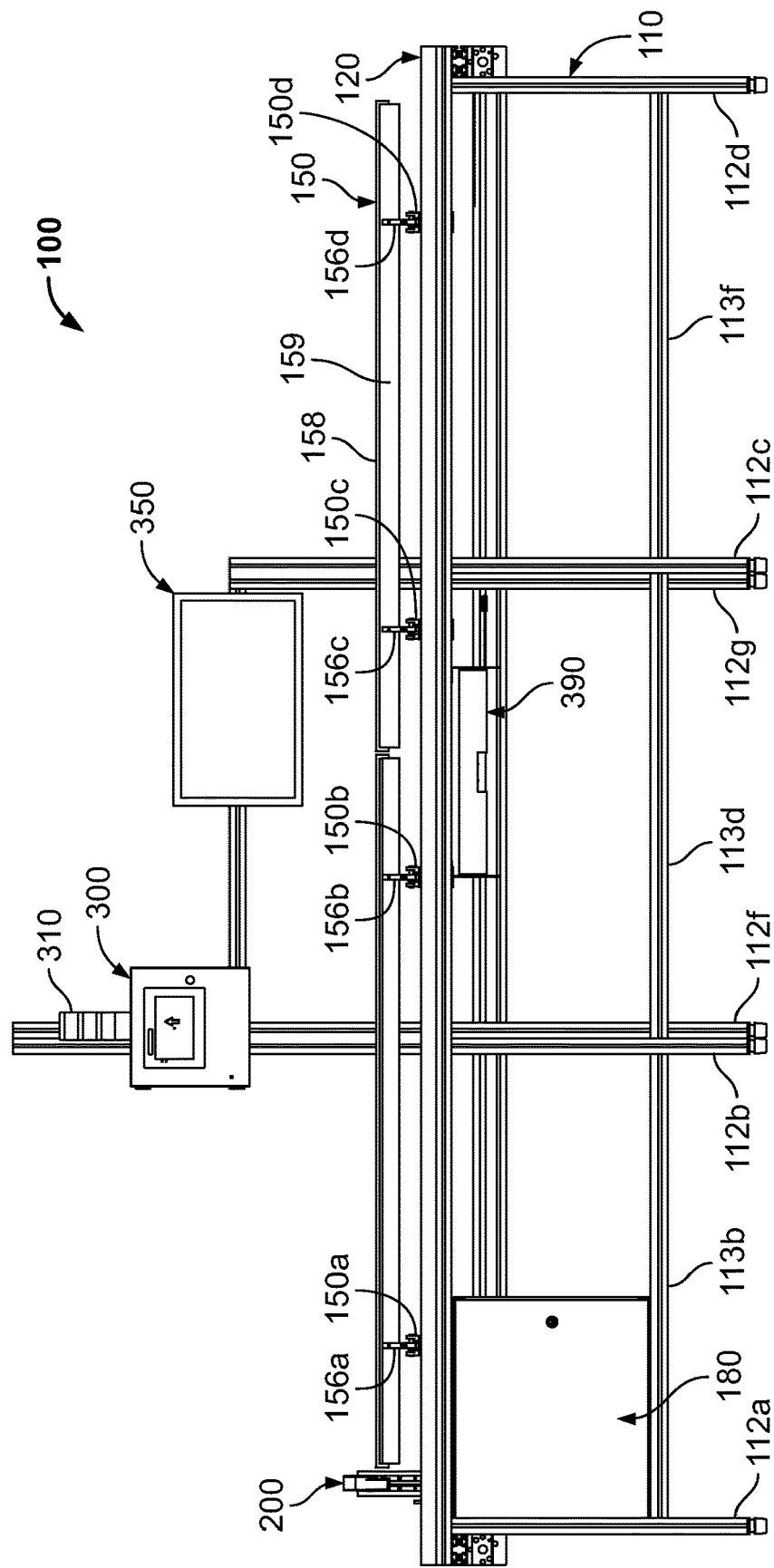
FIG. 2 is a front view of the measuring apparatus of FIG. 1.
Figure 3:
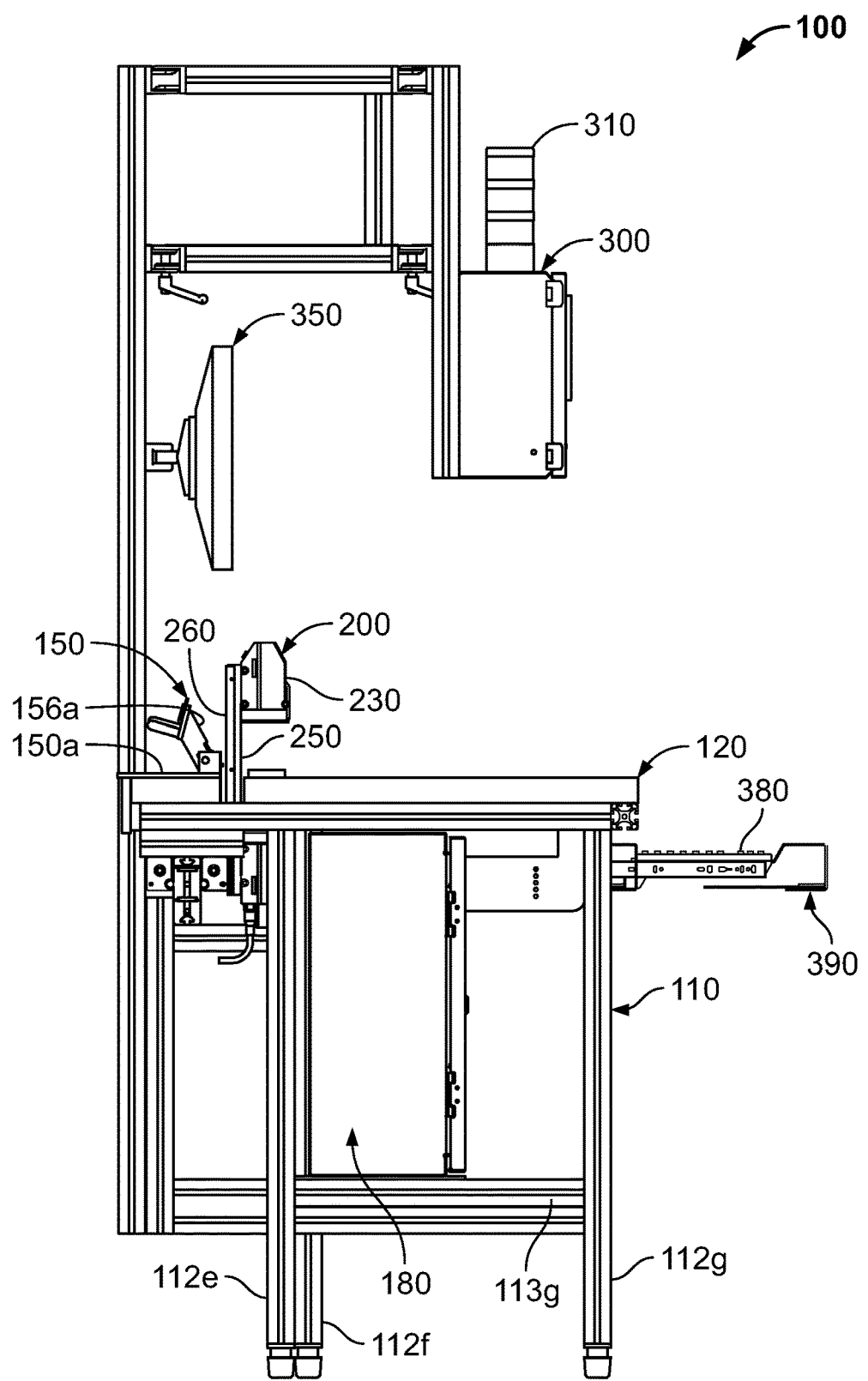
FIG. 3 is a first end view of the measuring apparatus of FIG. 1.
Figure 4:
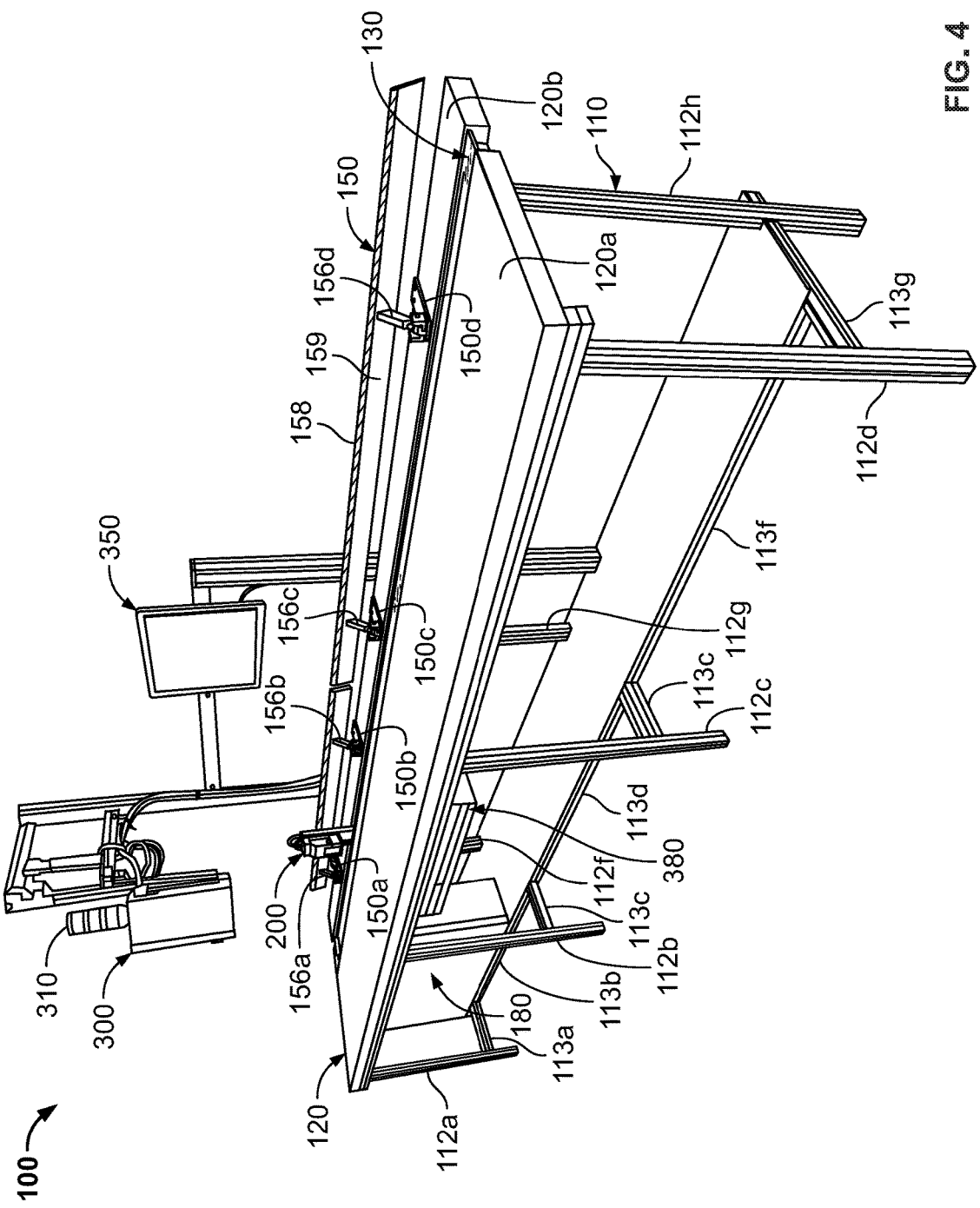
FIG. 4 is a second end perspective view of the measuring apparatus of FIG. 1.
Figure 5:
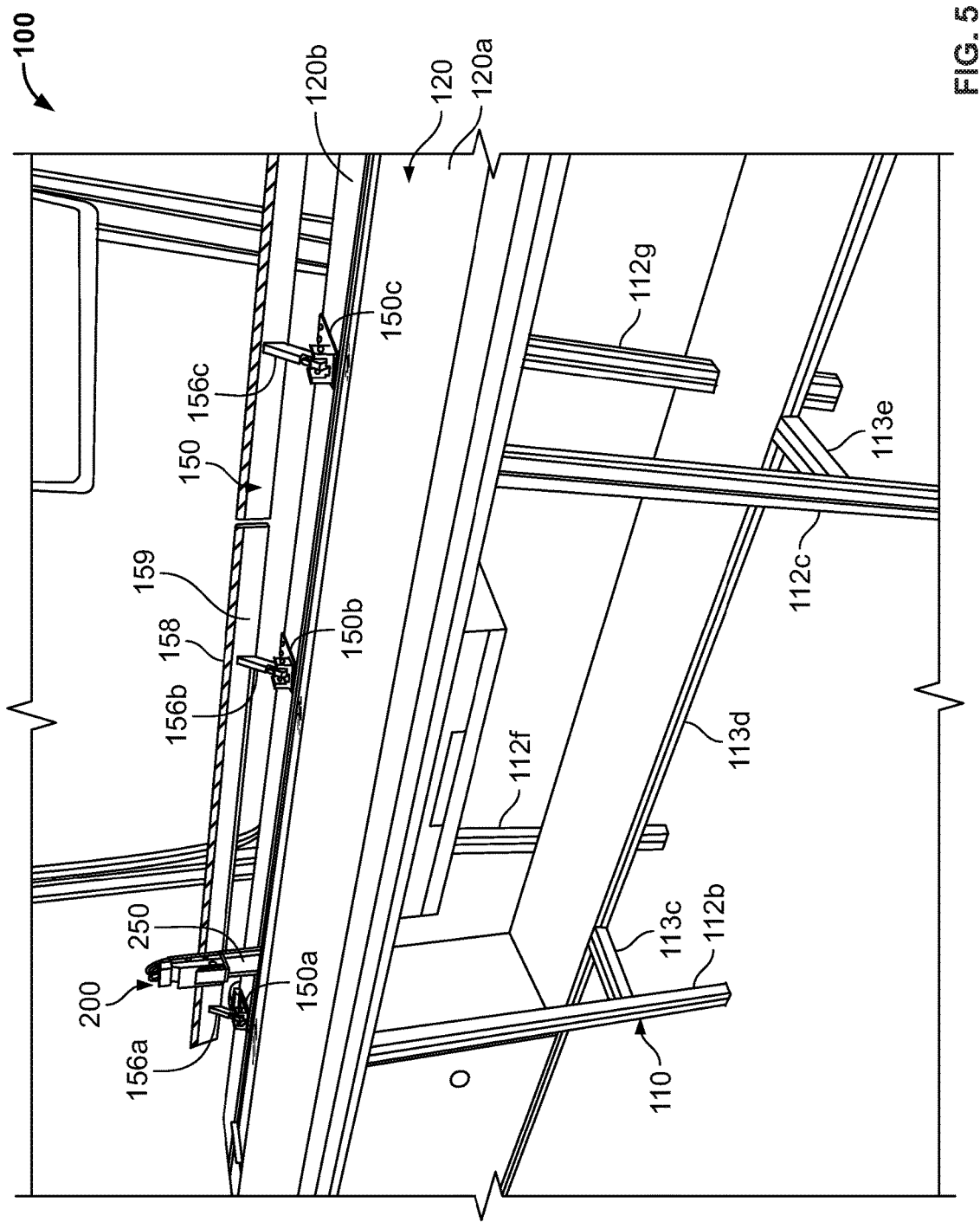
FIG. 5 is an enlarged front fragmentary perspective view of part of the measuring apparatus of FIG. 1.
Figure 6:
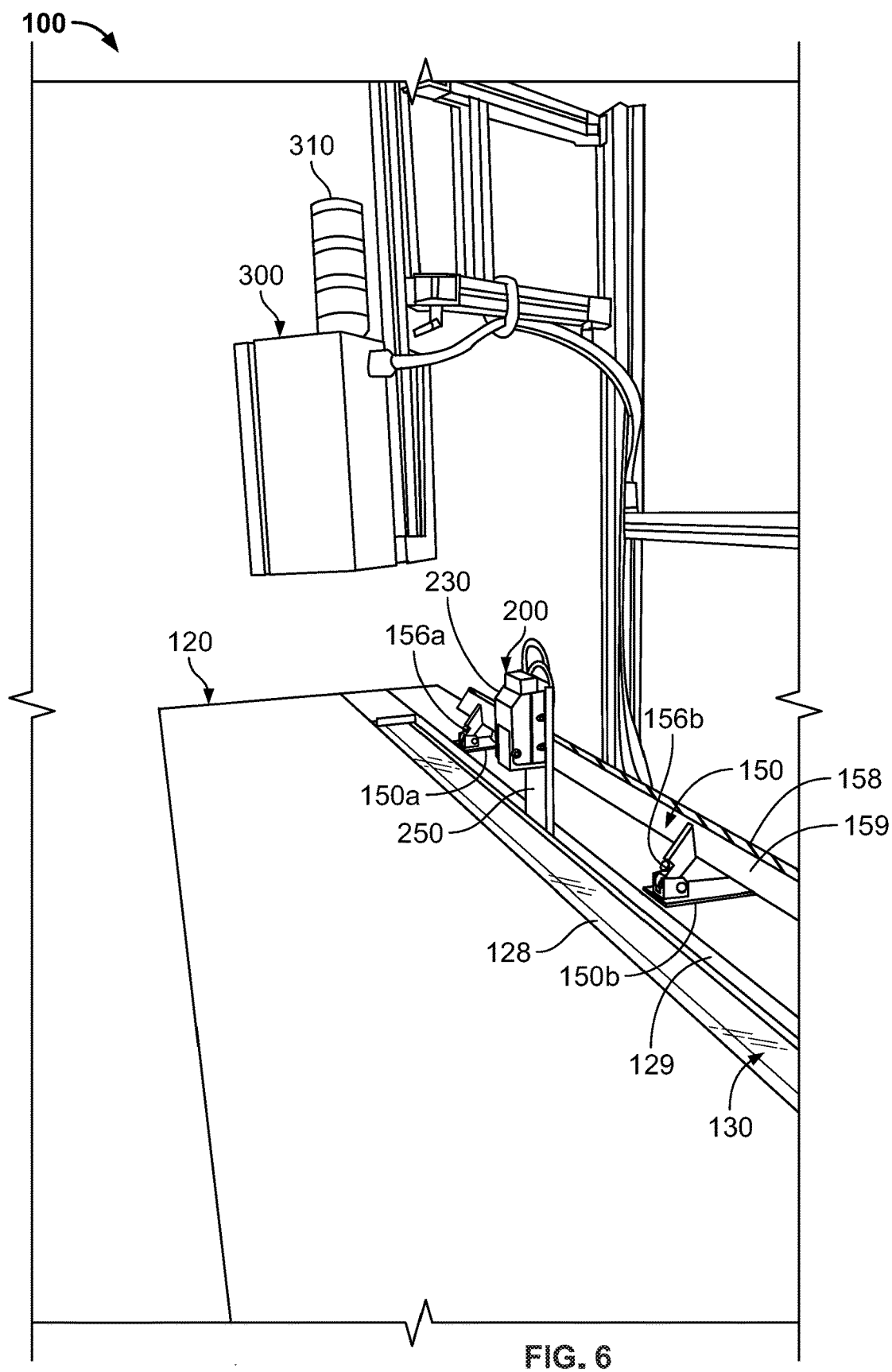
FIG. 6 is an enlarged second end fragmentary perspective view of part of the measuring apparatus of FIG. 1.
Figure 7:
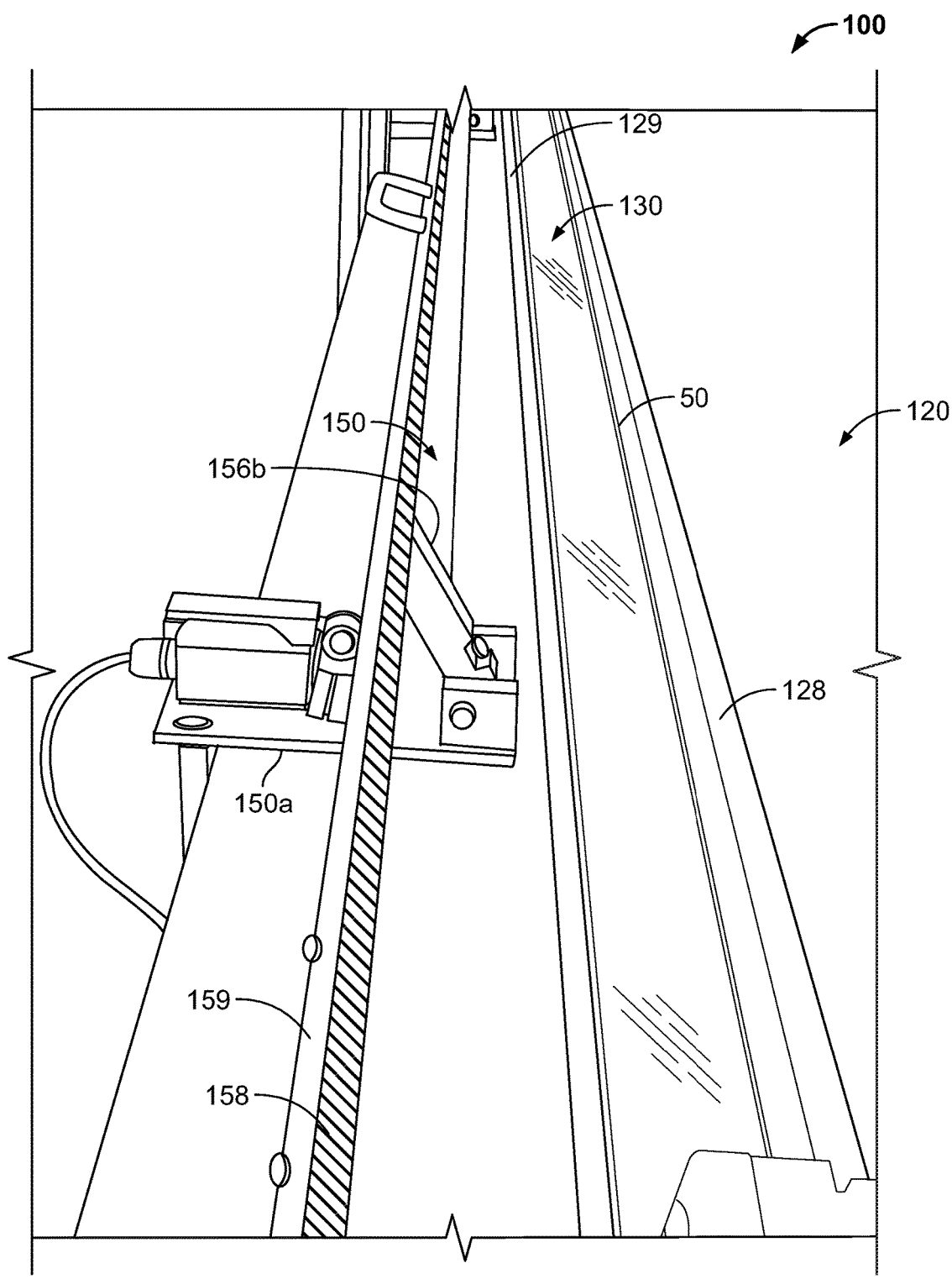
FIG. 7 is an enlarged first end top fragmentary perspective view of part of the measuring apparatus of FIG. 1.
Figure 8:
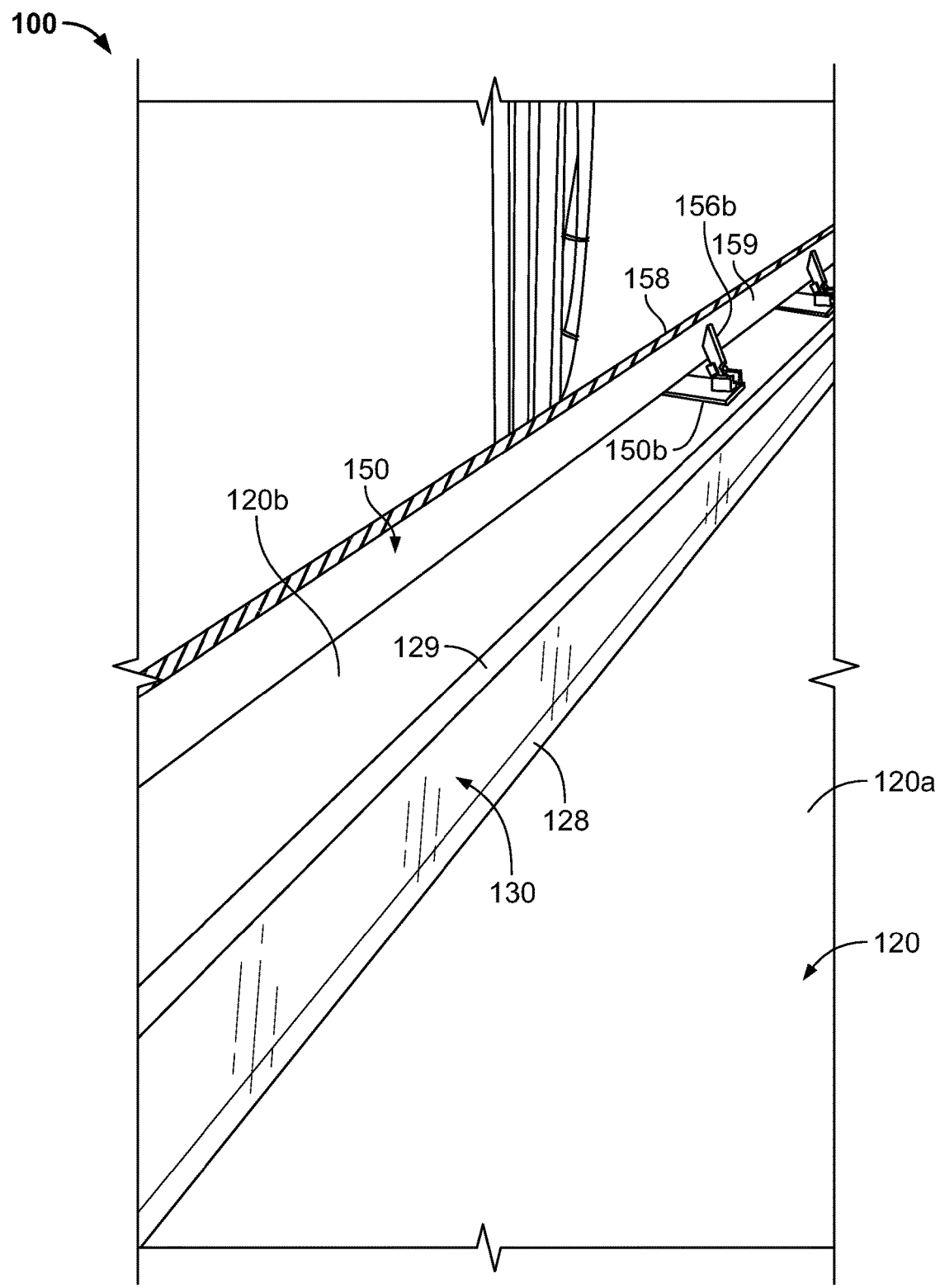
FIG. 8 is an enlarged first end front fragmentary perspective view of part of the measuring apparatus of FIG. 1.
Figure 9:
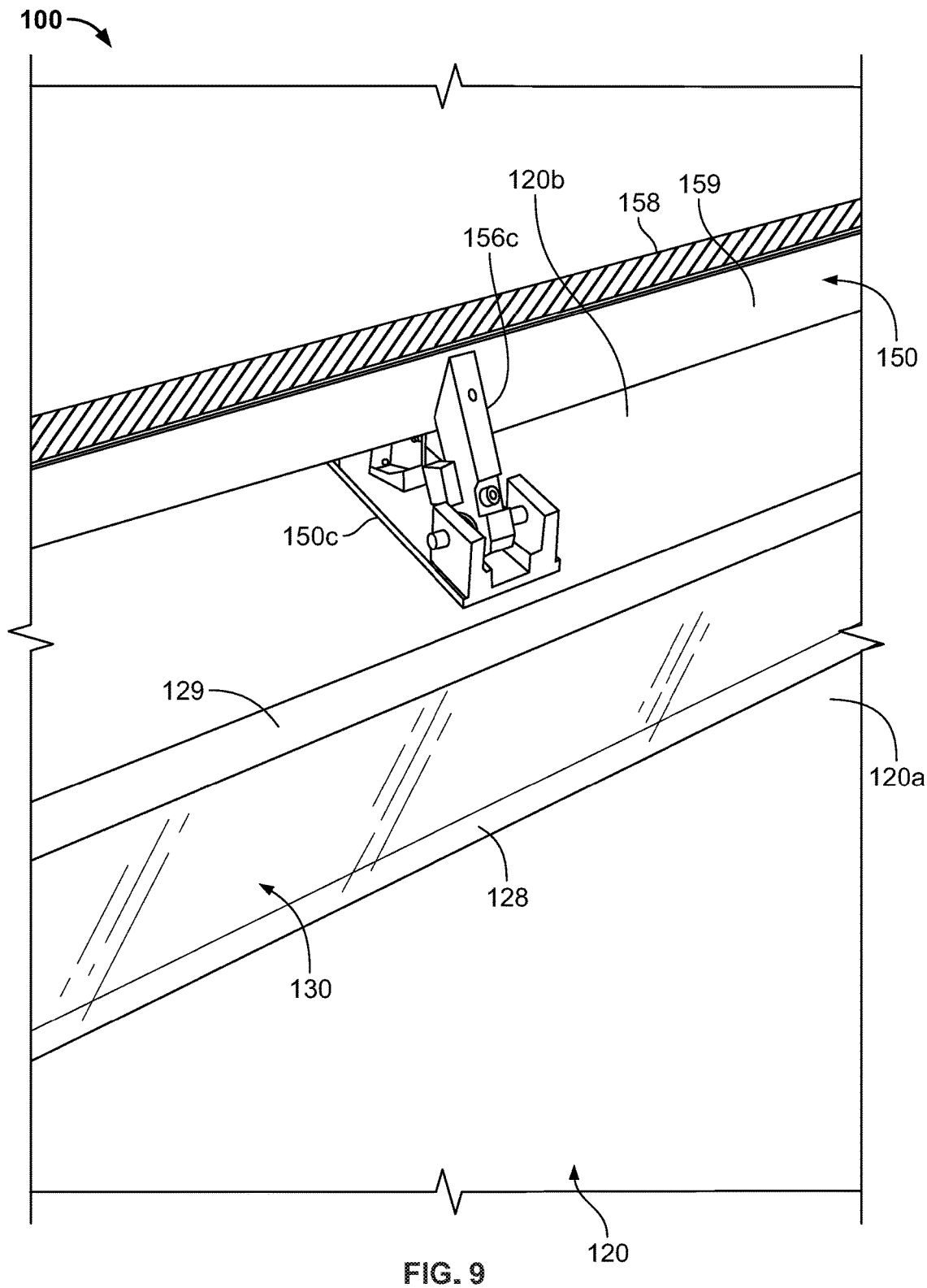
FIG. 9 is a further enlarged front fragmentary perspective view of part of the measuring apparatus of FIG. 1.
Figure 10:
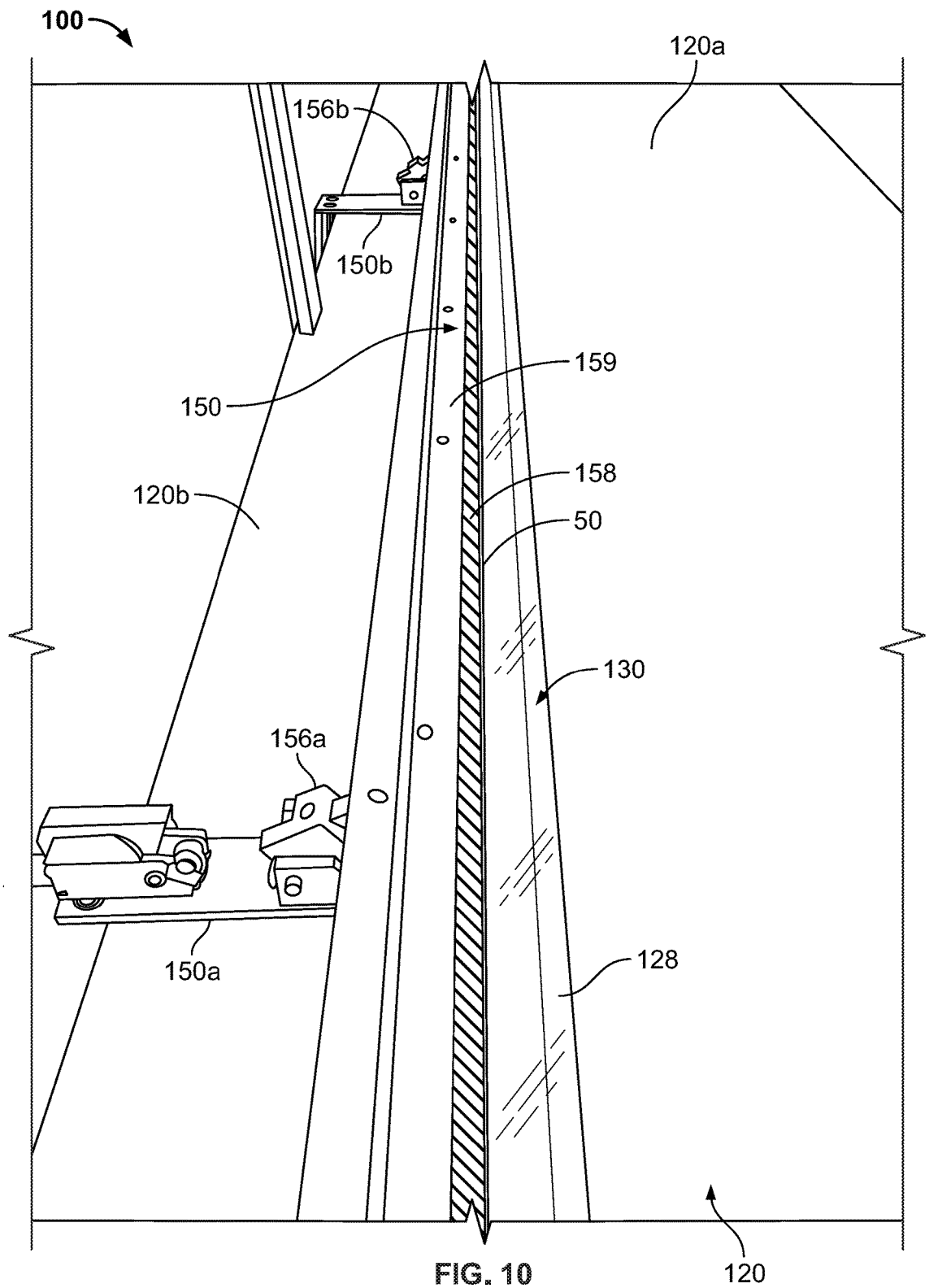
FIG. 10 is an enlarged first end fragmentary perspective view of part of the measuring apparatus of FIG. 1.
Figure 11:
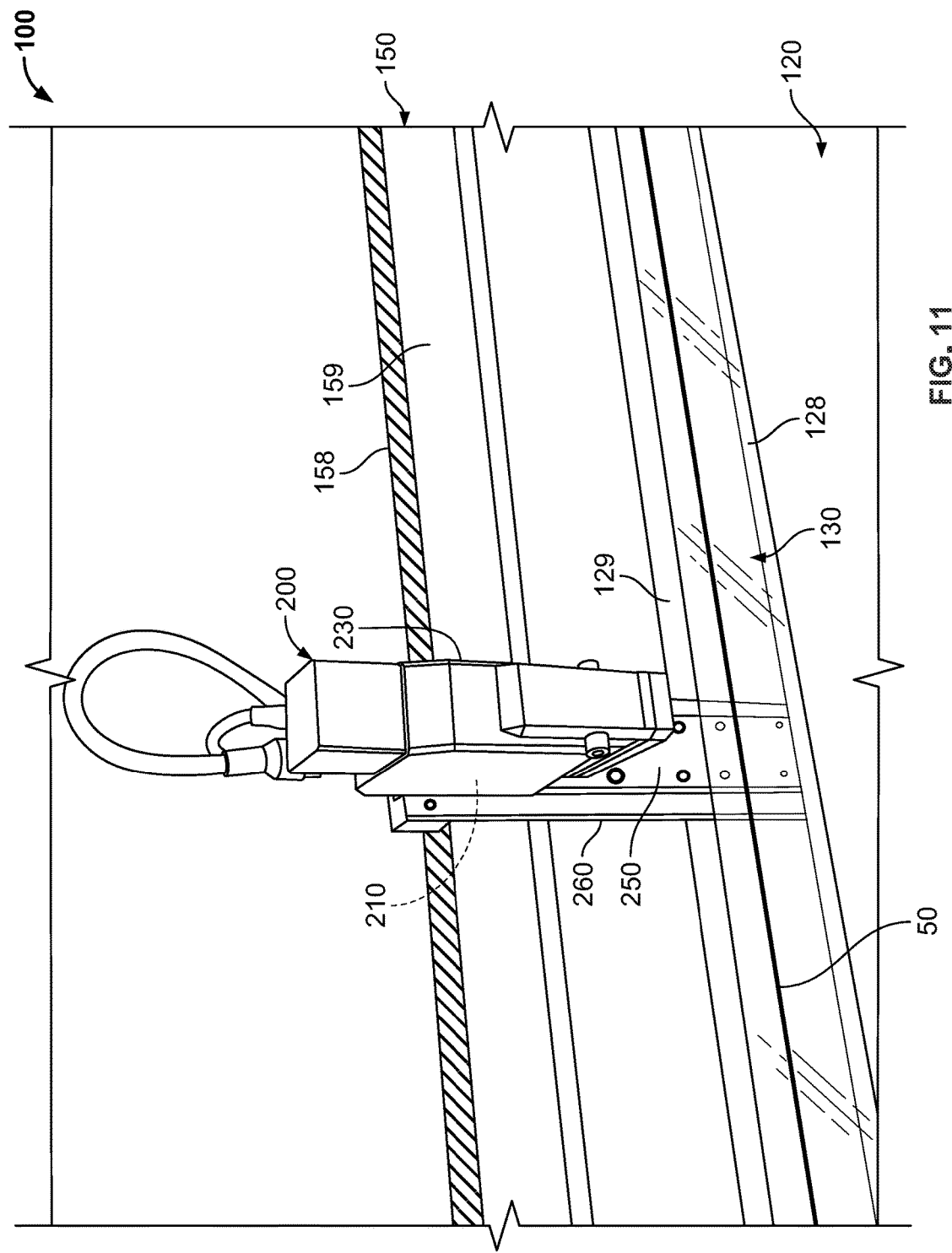
FIG. 11 is a further enlarged front fragmentary perspective view of part of the measuring apparatus of FIG. 1.
Figure 12:
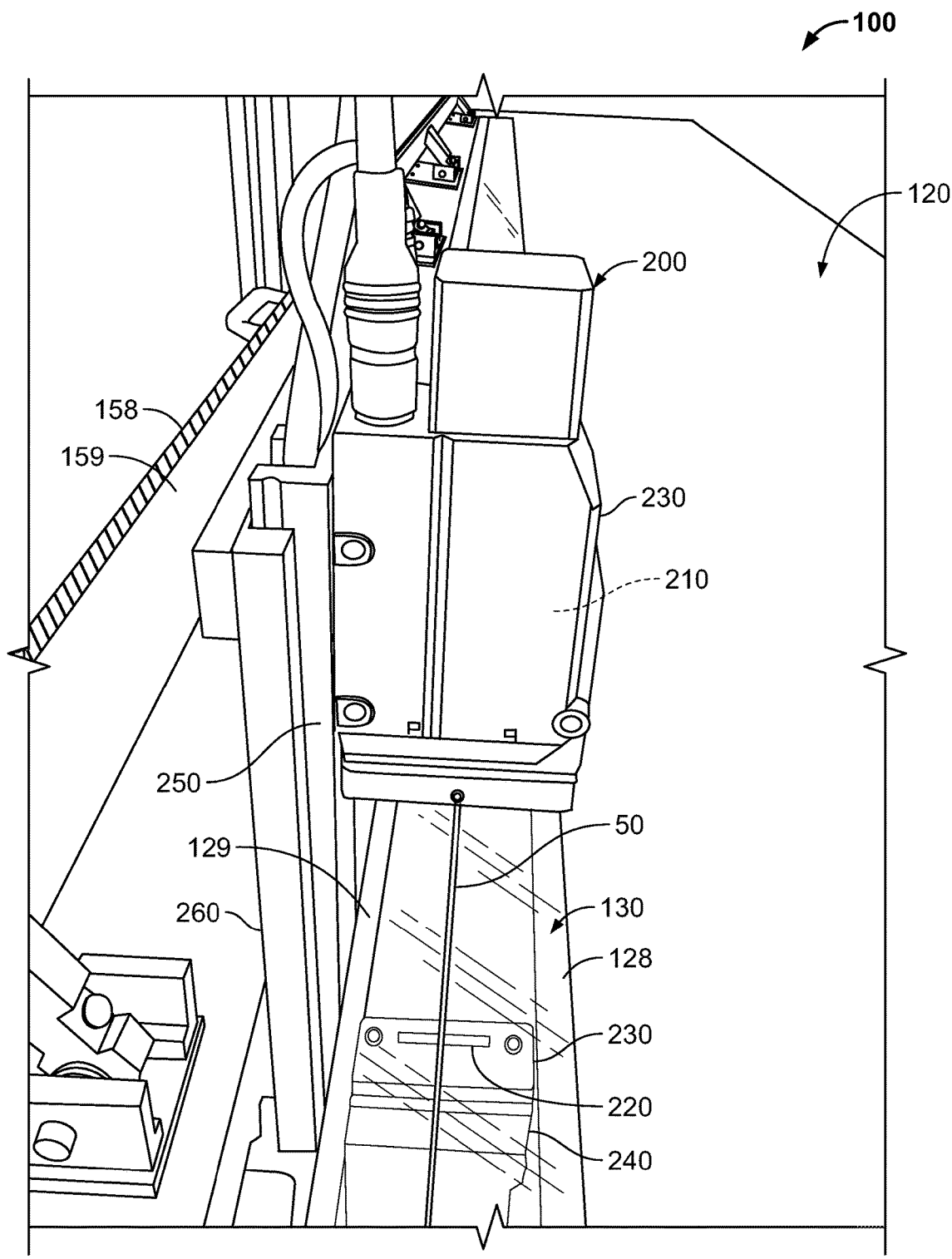
FIG. 12 is a further enlarged top first end fragmentary perspective view of part of the measuring apparatus of FIG. 1.
Figure 13:
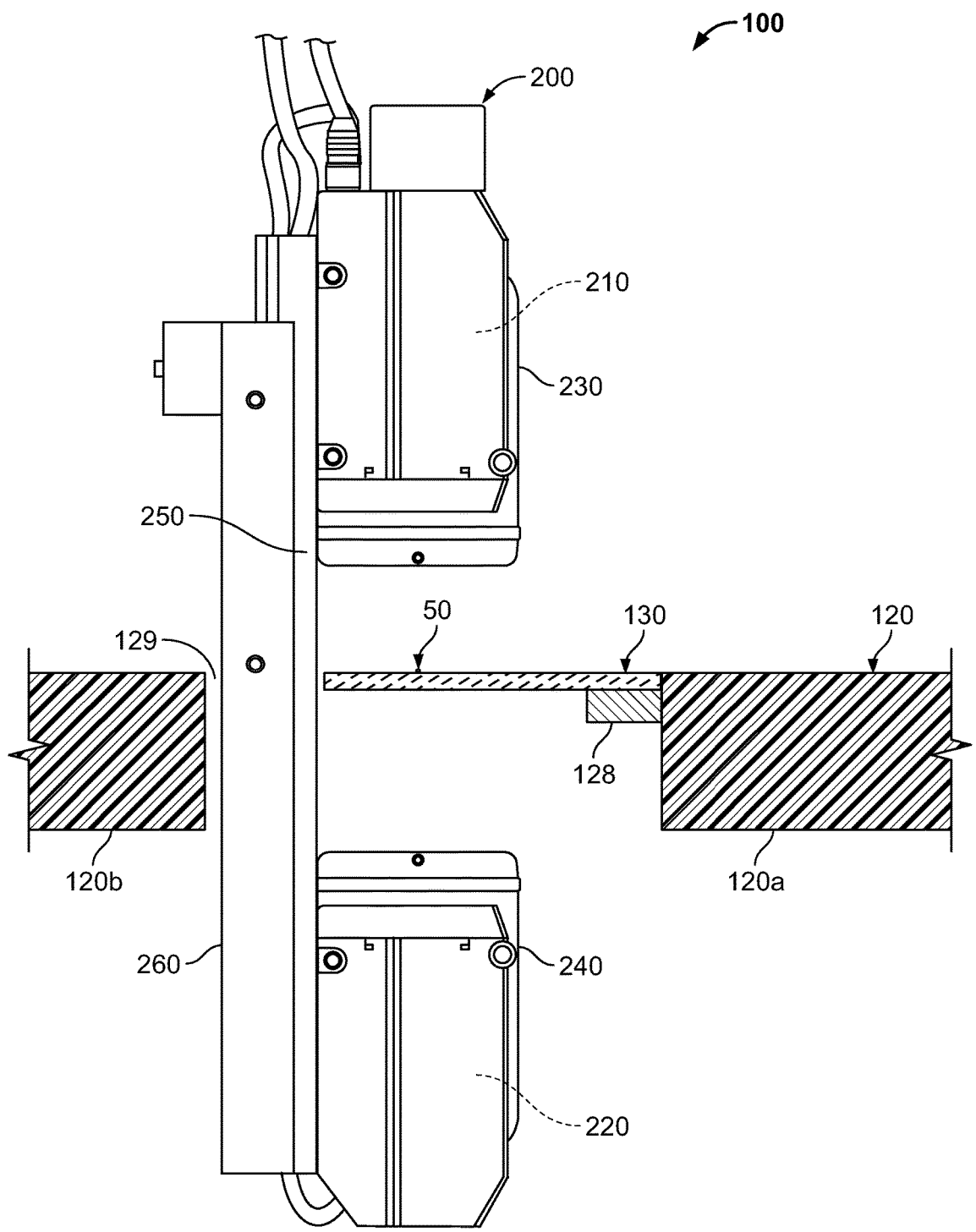
FIG. 13 is an even further enlarged first end fragmentary view of part of the measuring apparatus of FIG. 1.
Figure 14:
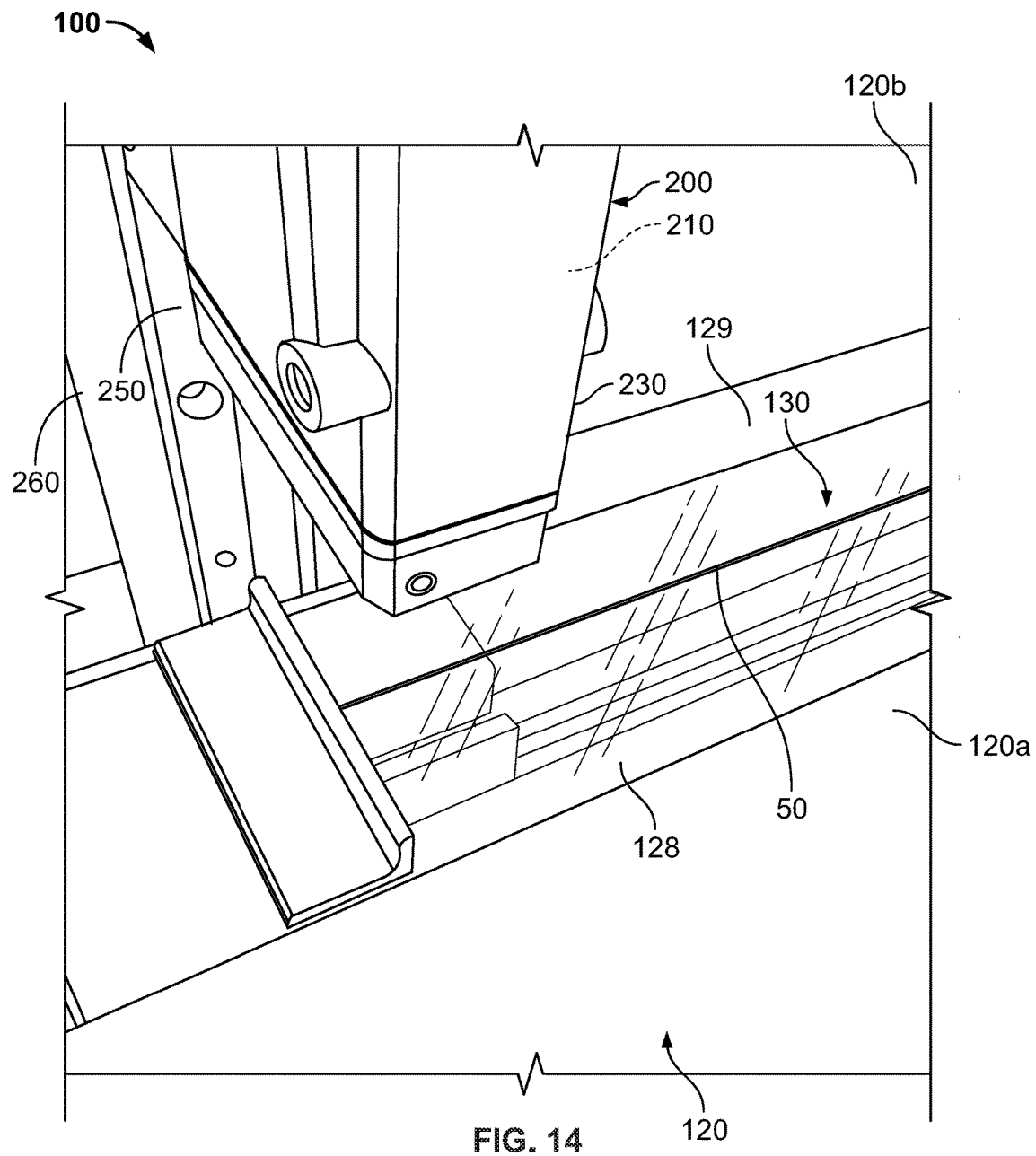
FIG. 14 is an even further enlarged first end fragmentary perspective view of part of the measuring apparatus of FIG. 1.

Referring now to FIGS. 1, 2, 3, 4, 5, 6, 7, 8, 9, 10, 11, 12, 13, 14, and 15, one example embodiment of the measuring apparatus 100 of the present disclosure is illustrated. For purposes of describing the illustrated example embodiment shown in FIGS. 1 to 15, an example coated guide wire 50 is used as the example elongated part. It should be appreciated that the present disclosure is not limited to measuring the outer dimensions of guide wires, and can be employed to measure the outer dimensions of other elongated parts.

The example illustrated measuring apparatus 100 generally includes: (1) an elongated frame 110; (2) an elongated top member 120 mounted on and supported by the frame 110; (3) an elongated transparent part supporter 130 mounted on and supported by the frame 110; (4) an elongated movable part straightener (or aligner) 150 pivotally connected to the elongated top member 120 and supported by the elongated top member 120 and the frame 110; (5) a movable optical measurer 200 movably connected to and supported by the frame 110; (6) a controller (not shown) positioned in a control box 180 that is connected to and supported by the frame 110; and (7) one or more input and output devices such as: (a) a combined display/input device 300 connected to and supported by the frame 110, (b) a display device 350 connected to and supported by the frame 110, (c) an input device 380 (in the form of a keyboard)

supported by a movable keyboard tray 390 that is connected to and supported by the frame 110, (d) one or more status or warning indication lights, and (e) one or more sound producing devices such as one or more speakers or alarms (not shown).

More specifically, the elongated frame 110 in this illustrated example embodiment includes: (1) a plurality of upright legs 112a, 112b, 112c, 112d, 112e, 112f, 112g, and 112h; (2) a plurality of transversely extending leg connectors 113a, 113b, 113c, 113d, 113e, 113f, and 113g that are generally shown in FIGS. 1, 2, 3, 4, and 5; and (3) a series of other suitable transversely extending leg connectors that are not shown. The elongated frame 110 in this illustrated example embodiment includes additional display device supporting members (not labeled) that are configured to support the display/input device 300 and the display device 350. It should be appreciated that the frame 110 thus provides a suitable supporting structure for the example measuring apparatus 100 and that the frame may be alternatively constructed, configured, and sized in accordance with the present disclosure.

The illustrated example elongated top member 120 is mounted on, connected to, and supported by the frame 110. The illustrated example elongated top member 120 is configured in part to provide a working surface for the measuring apparatus 100, and can be used to support elongated parts (such as guide wires) before or after they are each placed on the elongated transparent part supporter 130 for measurement. The top member includes an elongated first or front top member 120a and an elongated second or rear top member 120b spaced apart from the front top member 120a. The top member 120 (including the front top member 120a and the elongated rear top member 120b) in this illustrated example embodiment has respective flat horizontally extending top surfaces (not labeled), respective horizontally extending bottom surfaces (not labeled), respective inner vertically extending side edges (not labeled), respective outer vertically extending side edges (not labeled), respective first vertically extending end edges (not labeled), and respective second vertically extending end edges (not labeled). The top member 120 and specifically the front top member 120a and the rear top member 120b define there between an elongated rectangular part supporter receiving pocket (not labeled) configured to receive the elongated part supporter 130. The top member 120 and specifically the front top member 120a and the rear top member 120b also define there between an elongated rectangular optical measurer receipt slot 129 configured to receive the movable housing support structure such as a support arm 250 of the optical measurer 200 as further described below. It should be appreciated that the top member may be alternatively configured and sized in accordance with the present disclosure.

Although not shown, the top member may include a visible dimensional scale along the entire length of top member for a variety of purposes.

The top member 120 and/or the frame 110 are configured to hold and support the elongated transparent part supporter 130. More specifically, the frame 110 includes a plurality of suitable brackets (not all shown) that are configured to support the elongated transparent part supporter 130. In this illustrated example embodiment, the brackets include at least two opposite end brackets (not labeled) and one or more intermediate brackets (not shown). The brackets can also include an elongated front side member such as member 128. The elongated transparent part supporter 130 rest on these brackets. It should be appreciated that the brackets may be alternatively configured and sized in accordance with the present disclosure.

The elongated transparent part supporter 130 in this illustrated example embodiment includes an elongated rectangular specifically formulated transparent glass (or glass-like) panel that has a flat horizontally extending top surface (not labeled), a bottom horizontally extending surface (not labeled), an inner vertically extending side edge (not labeled), an outer vertically extending side edge (not labeled), a first vertically extending end edge (not labeled), and a second vertically extending end edge (not labeled). The specifically formulated glass (or glass-like) panel can be formed in one section or from multiple adjacent sections (which may or may not be suitably connected) in accordance with the present disclosure. The glass panel in this illustrated embodiment is made from one section of glass but could be made from multiple adjacent sections of glass. It should be appreciated from the above that the specific formulation of specified glass part supporter does not affect or alter the wavelength of the light beam of the optical measurer. In various other embodiments, the part supporter is made from a suitable plastic material such as an acrylic material or a polycarbonate material. It should further be appreciated that suitable brackets (not all shown) are employed to support the section(s) that form the glass panel and thus the elongated transparent part supporter. It should be appreciated that the part supporter may be alternatively configured and sized in accordance with the present disclosure.

It should also be appreciated that the part supporter can alternatively include a plurality of spaced apart part supporting members (such as a series of transversely extending part supporting bars) that are positioned in areas where measurements are not taken. In various such embodiments, one or more of these part supporting bars have an upper V shape for receiving and holding the elongated part.

It should further be appreciated that the controller (discussed below) can account for any brackets (or other members) that support the transparent part supporter. For example, the controller can account for an occlusion at the location of a central bracket (or other member) underneath and supporting the glass panel (which the controller would know is at a fixed position). In other words, the software of the measuring apparatus would expect an occlusion at that point and read no value (i.e., provide a NV indication on the display device and on any accompanying digital or printed report).

It should also be appreciated that the part supporter can be alternatively configured in accordance with the present disclosure. For instance, as mentioned above, instead of glass, the transparent member can be made from a suitable plastic material that does not affect or alter the wavelength of the light beam. In various such embodiments, the optical measurer can be calibrated to be unaffected by the refractive index of the respective transparent member.

The illustrated example elongated movable part straightener 150 includes: (1) a plurality of bases 150a, 150b, 150c, and 150d suitably fixedly connected to the elongated rear top member 120b of the frame 110; (2) a plurality of pivot members 156a, 156b, 156c, and 156d each pivotally connected to the respective bases 150a, 150b, 150c, and 150d; (3) a straight elongated part engager 158; and (4) an elongated part engager holder 159 suitably connected to the pivot members 156a, 156b, 156c, and 156d and suitably connected to and supporting the elongated part engager 158. The elongated movable part straightener 150 is configured to be in a part non-engaging position shown in FIGS. 1 to 9, 11, and 12, configured to be in a part engaging position shown in FIG. 10, and configured to be manually move by an operator to each of these positions. In the part non-engaging position, the movable part straightener 150 and particularly the elongated part engager 158 does not interfere with any of the other components. In the part engaging position, the movable part straightener 150 is configured such that the elongated part (such as guide wide 50) can be positioned adjacent to and in engagement with the outer edge of the elongated part engager 158 to position the elongated part (such as the guide wire 50) on the part supporter 130 in a straight or substantially straight position for measurement.

In various embodiments, the elongated straight part engager 158 includes a suitable rubber such as a silicone rubber or polymer. In various embodiments, the part engager has a very soft durometer rubber edge configured to engage very fine elongated parts such as guide wires that have a 0.003 inch (0.0762 mm) diameter and are very flexible.

It should be appreciated that the part straightener may be alternatively configured and sized in accordance with the present disclosure.

In various alternative example embodiments, the part straightener employs one or more one or more vacuum suction devices to straighten the elongated flexible part. In various such embodiments, the vacuum suction devices can be moved into and out of position automatically or manually.

In various example embodiments, the present disclosure contemplates that a suitable vacuum system can be employed to help align the elongated part. In certain such embodiments, vacuum ports are provided in the transparent part supporter to gently hold the elongated part in a prescribed area of the transparent part supporter.

In various alternative example embodiments, the part straightener employs one or more one or more magnets to straighten the elongated flexible parts and particularly feromagnetic flexible elongated parts (such as flexible elongated parts made from stainless steel that are slightly magnetic). In various embodiments, rare earth magnets can be employed under the glass part supporter as part of the part straightener. In various other embodiments, the present disclosure contemplates that the use of rare-earth magnets embedded into an optically transparent acrylic part supporter or bonded to the underside of a glass alloy part supporter in a manner to help align and hold elongated parts in a prescribed area. In certain such embodiments, a relatively thin glass or thins sections of glass are employed.

In various alternative example embodiments, a precision rail system can be connected to the frame and mounted above the glass part supporter to hold a suction or vacuum device firmly along the longitudinal center of the glass part supporter.

In various alternative example embodiments, the part supporter can include one or more clamps employed to attach to one or more of the ends of the elongated part.

In various alternative example embodiments, a tensioning tool balancer cable system can be employed for straightening the part. In various such embodiments, the tool balancer cable system includes a fine flexible fabric wire or cable that is configured to hold the elongated part in a straight position right down the center line of the glass part supporter. In various such embodiments, the tool balancer cable system exerts a small amount of adjustable force on the elongated part.

In various alternative example embodiments, the part straightener employs one or more one or more gripping or tweezing or magnetic devices to grip and thereby straighten the elongated flexible part and hold it substantially perpendicular to the elongated axis of the measuring apparatus.

It should be appreciated that the measuring apparatus can be alternatively employed to measure a flexible elongated part that has one or a series of bends such as S bends, as long as the width of the flexible part is within about an inch and three quarters on the optical measurer.

In various alternative example embodiments, the part straightener is also configured to slightly stretch the flexible elongated member. For various elongated parts, the stretch must be very delicate (such as measured in fractions of ounces).

In various alternative example embodiments, the part straightener is also configured to hold the flexible elongated member taught.

In various alternative embodiments, the part straightener includes one or more other part alignment devices configured to straighten or align the elongated part along a central axis on the part supporter where the central axis of the light beam will extend. In various such embodiments, one or more of the alignment devices includes one or more elongated part holders that are configured to hold one or more ends of the elongated part (such as the opposite ends of a guide wire) to keep the elongated part parallel, straight, and under slight tension. In various such embodiments, one or more weight and pulley devices may be employed to connect to the elongated part and keep the elongated part under slight tension.

In various example embodiments, one or more air cylinder controlled grippers that can be mounted on a sliding parallel rail system may be employed for such purposes.

In various example embodiments, the part supporter is formed with one or more elongated grooves that are configured to respectively hold the elongated parts (such as the elongated wires or mandrels) in parallel positions on the part supporter. In such example embodiments, the part straightener may not be required. It should also be appreciated that in the embodiments that are configured to hold a single elongated part and that only include a single elongated groove in the part supporter, that the part straightener may also be eliminated. The grooves can be laser etched or other formed in the part supporter. In various embodiments, the groove has a depth of approximately ¼ to ½ of the outer diameter of the elongated part.

In various example embodiments, the measuring apparatus of the present disclosure is configured to simultaneously take measurements of multiple parallel extending quantities of parts on the part supporter. In various such example embodiments, the optical measurer will not measure the area between the elongated parts (such as the elongated wires or mandrels) on the part support, but rather will individually measure the discrete separated elongated parts (such as the elongated wires or mandrels) on the part supporter and generate multiple dimensional reports for each elongated part and it's parallel manner (e.g., in pairs, triples, quadruples, etc).

Turning back to the figures, the illustrated example movable optical measurer 200 is configured to take measurements of the outer dimensions at multiple spaced apart positions along the length of an elongated part (such as along the length of guide wire 50) when the elongated part is positioned on the part supporter 130 as shown in FIGS. 7, 11, 12, and 14. In this illustrated example embodiment of the present disclosure, the movable optical measurer 200 is supported by the frame 110 and includes a light generator indicated by dotted line 210 and positioned in a light generator housing 230, a light receiver indicated by dotted line 220 and positioned in a light receiver housing 240, a support arm 250 connected to the light generator housing 230 and the light receiver housing 240, a carriage 260 connected to the support arm 250, and an carriage actuator assembly (not shown) suitably connected to the carriage 260 and controlled by the controller.

More specifically, the light generator 210 is suitably mounted in the light generator housing 230. The light generator 210 and the light generator housing 230 are positioned above the top surface of the part supporter 130. The light generator housing 230 is suitably connected to the upper portion of the support arm 250. The light generator housing 230 defines a bottom opening (not shown) so that the light beam generated by the light generator 210 can be emitted from the light generator housing 230 and directed towards the light receiver 220 without being obstructed by the light generator housing 230. The light generator housing may be alternatively configured and sized in accordance with the present disclosure.

In various other embodiments, the light generator is positioned below the transparent part supporter and the light generator is positioned above the transparent part supporter, and thus the rays extend upwardly from the light generator through the part supporter to the light receiver.

The light receiver 220 is suitably mounted in the light receiver housing 240. The light receiver 220 and the light receiver housing 240 are positioned below the bottom surface of the part supporter 130. The light receiver housing 230 is suitably connected to the lower portion of the support arm 250. The light receiver 220 is positioned so that it is vertically aligned with the light generator 210. The light receiver housing 240 defines a top opening (not labeled) so that the light beam generated and emitted by the light generator 210 can be received from the light generator 210 by the light receiver 220 without being obstructed by the light receiver housing 240. The light receiver housing may be alternatively configured and sized in accordance with the present disclosure.

The light generator 210 and the light receiver 250 are thus securely fixed via the support arm 250 to the movable carriage 260 that is movably connected to the frame 110. The movable carriage 260 is configured to simultaneously move the light generator 210 and the light receiver 220 to each of a plurality of spaced-apart stop or measurement positions along or adjacent to the elongated part supporter 130 as discussed below.

In this illustrated example embodiment, the light generator 210 and the light receiver 220 are in the form of a high precision optical micrometer system, and particularly from the LS-9000 series optical micrometers manufactured by Keyence Corporation. It should be appreciated that other suitable or comparable devices can be employed to take the measurements as described herein. For example, in alternative embodiments, the optical measurer is in the form of a laser micrometer instead of a light micrometer.

In various other embodiments, multiple light generators and light receivers, such as multiple light micrometers can be employed in accordance with the present disclosure. In various such embodiments, two of these devices can be employed in a "V" or "X" configuration. This can result multiple simultaneous outputs of dimensional data for the same elongated part.

In various modes of operation as further described below, the light generator 250 is configured to generate one or more light beams that each comprises several parallel extending rays that are projected vertically downwardly toward the elongated part (such as a guide wire 50) positioned on the part supporter 130. The light beam is significantly wider than the elongated part (such as the guide wire 50) that is being measured. The light beam is projected onto (and partly pass) the elongated part (such as the guide wire 50) to measure the outer diameter of elongated part (such as the guide wire 50 before or after the guide wire 50 is coated). The portions of the light beam rays that are not blocked by elongated part (such as the guide wire 50) extend into, through, and out of the transparent glass part supporter 130 and towards and to the light receiver 220. The distance between the unblocked portions of the light beam rays represent the outer dimension or outer diameter of the elongated part (such as the guide wire 50). In various embodiments, the light receiver 220 detects and converts the received or unblocked portions of the light beam rays to electrical signals. The electrical signals are then communicated or transferred to the controller (not shown) that is programmed to perform a calculation based on the received electrical signals to determine the measured outer dimension of the measured section of the elongated part (such as the guide wire 50) based on these electrical signals.

As mentioned above, the measuring apparatus of this illustrated example embodiment of the present disclosure is controlled by a suitable controller (not shown). The controller is suitably communicatively connected to or configured to communicate with the movable optical measurer 200, and with the input and output devices such as the combined input and display device 300, the display device 350 any indicator lights, and any sound producing devices. In various embodiments, the controller includes one or more local suitable processing devices or a set of processing devices, such as but not limited to: a processor, a microprocessor, a microcontroller-based platform, a suitable integrated circuit, or one or more application-specific integrated circuits (ASICs), configured to execute software enabling the various functions described herein. In various embodiments, the controller also includes one or more memory devices such as but not limited to: (1) volatile memory (e.g., RAM that can include non-volatile RAM, magnetic RAM, ferroelectric RAM, and any other suitable forms); (2) non-volatile memory (e.g., disk memory, FLASH memory, EPROMs, EEPROMs, non-volatile solid-state memory, and any other forms); (3) unalterable memory (e.g., EPROMs and any other forms); (4) read-only memory; and/or (5) a secondary memory storage device such as a non-volatile memory device, configured to store software related information. Any other suitable magnetic, optical, and/or semiconductor memory may operate in conjunction with the measuring apparatus of the present disclosure. In various embodiments, the memory device is configured to store program code and instructions executable by the processing device of the measuring apparatus to control the measuring apparatus. The memory device can also be configured to store other data such as but not limited to operating data, wire identification related data and wire measurement data. In various other embodiments, the memory device also stores authentication and/or validation related information to verify information received from one or more operator input devices.

In various embodiments, the controller resides within the control box 180 of the measuring apparatus 200 while in other embodiments the controller resides outside of the control box 180 of the measuring apparatus 200.

In various other embodiments of the present disclosure, the controller includes one or more remote processors. In the embodiments with one or more remote processors, the measuring apparatus is configured to connect to a data network in a suitable manner. In various such embodiments, this connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable communication method. It should be appreciated that the measuring apparatus can thus communicate direct with manufacturers or other entities and provide real time (or delayed) output data such as measurement data (that can be secured and thus not interfered with to add integrity to the data stream and integrity to the manufacturing system.

In various embodiments, the display device(s) include but are not limited to: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. As indicated above, in various embodiments of the present disclosure, the display device 300 is associated with or includes a built in touch-screen input device that functions as one of the input devices of the measuring apparatus. In various embodiments, the touch-screen is coupled to a touch-screen controller or other touch-sensitive display overlay to enable interaction with any images displayed by the display device.

In various embodiments, the sound producing device(s) include but are not limited to: (1) one or more speakers; (2) associated headphones, earphones, or earbud configured to be in communication with the controller; and/or (3) one or more alarms or bells. The sound producing devices may be connected to and supported by any suitable part of the frame, or otherwise suitable situated. The sound producing devices enable the measuring apparatus of the present disclosure to produce sounds such notifications in the form of one or more different alarms to alert the operator when the measuring apparatus detects one or more issues with a determined outer dimension of an elongated part being measured as further described below. Such an issue can be, for example, that a measured portion along the length of the elongated apart is above or below a required specification for that elongated part. In various embodiments, the sound producing device(s) produce a synthesized voice that provides pre-formed or pre-recorded messages such as but not limited to "oversized", "undersize", or "measure again."

The measuring apparatus of the present disclosure can be configured to operate in many different modes of operation. Various example modes of operation are described herein. The present disclosure is not limited to the example modes of operation described herein.

In various example modes of operation, the illustrated example movable optical measurer 200 is configured to operate with the controller, the display device(s), any indicating lights, any sound producing device(s), and the input device(s) to move along the part supporter 130 and to the elongated part (such as the guide wire 50) positioned on the elongated transparent part supporter 130 to: (1) receive inputs to take measurements of the elongated part (such as the guide wire 50); (2) take measurements of the outer dimensions of the elongated part (such as the guide wire 50) (a) along entire the length or substantial portions of the elongated part (such as the guide wire 50), and/or (b) at multiple spaced apart measurements of the outer dimensions of the elongated part (such as the guide wire 50) at multiple spaced apart sections along the length of the elongated part (such as the guide wire 50); (3) display such measurements to an operator; and (4) cause the sound producing devices to provide any needed audio indications to the operator.

It should be appreciated that the support arm 250 of the movable optical measurer 200 is configured to, under the control of the controller, to move back and forth in the elongated rectangular optical measurer receipt slot 129 to and stop at each of the determined positions along the elongated part (such as guide wire 50) positioned on the part supporter 130. Certain of these different positions are shown in: (1) FIGS. 1, 2, 3, and 14 that show an initial position; and (2) FIGS. 4, 5, and 6 that show a further position.

In this illustrated example embodiment, the combined input and display device 300 is connected to, mounted on, or supported by the frame 110 to enable an operator to operate the measuring apparatus 200. The illustrated example combined input and display device 300 includes a touch screen and a display screen that enable the operator to make inputs to control the measuring apparatus. The present disclosure contemplates multiple different types of modes of operation for the measuring apparatus.

In various modes of operation, at each point of measurement along the length of the elongated part, the optical measurer moves to that position, stops, and takes the measurement. For example, in one such example mode of operation, the input and output devices of the measuring apparatus such as the combined input and display device 300 enable the operator to: (1) make one or more inputs selecting all of the spaced-apart stop or measurement positions along the length of the elongated part (such as the guide wire 50) on the part supporter 130 at which the operator wants the measuring apparatus 100 to take outer dimensional measurements of the elongated part (such as the guide wire 50); (2) initiate the measurement process; and (3) view the displayed outer dimensional measurements taken of the elongated part (such as the guide wire 50) at the selected spaced-apart stop or measurement positions along the elongated part. It should be appreciated that the one or more inputs by the operator to select all of the spaced-apart positions along the elongated part (such as the guide wire 50) at which the operator wants the measuring apparatus 100 can be of: (1) preselected or preprogrammed stop or measurement positions; (2) operator selected stop or measurement positions; or (3) a combination of (1) and (2).

In another example mode of operation, the input and output devices of the measuring apparatus such as the combined input and display device 300 enable the operator to: (1) cause the measuring apparatus 100 to take outer dimensional measurements along the entire length of the elongated part (such as the guide wire 50) on the part supporter 130; (2) initiate the measurement process; and (3) view the displayed outer dimensional measurements taken of the elongated part (such as the guide wire 50) along the entire elongated part. In such a mode, the measuring apparatus scans or measures the entire length of the elongated part, and if there is an area of the elongated part that is either over or under the specified acceptable range of the outer diameter, the measuring apparatus causes one or more of the output devices to provide one or more indications to the operator that: (1) there is a problem with the outer diameter at a specific area of the elongated part; and (2) the specific area of the problem. Such output devices can include one or more: display devices, warning indicator lights, and/or sound producing devices as mentioned above. In various such embodiments, the optical measurer can stop over an area of the elongated part that is out of the specification range to indicate that area to the operator. This mode of operation can substantially eliminate operator guesswork regarding the required outer diameter and locations of potential problems.

In various modes of operation, after a measurement is taken and the elongated part is determined to have one or more outer diameters out of specification, the measuring apparatus enables the operator to make an input (such as by touching a specific button) to cause the optical measurer move to and stop exactly at the problem area, and in various such embodiments direct the light beam at the problem area. In various embodiments, the optical measurer emits a light (such as a green light) that literally floods the area of concern of the elongated part with clearly visible (green) light. This can be repeated for each problem area. This enables the operator to place a marker such as tape in the area of deviation from the dimensional requirements for further examination such as at another workstation In various example modes of operation, the measuring apparatus can employ one or more of the output devices to provide an operator with a suitable visual and/or audio indication after each measurement of the elongated part is taken that is within or outside of the required specifications. For example, one of the output devices can include a green light and a red light controlled by the controller and configured to indicate the associated status of each measurement. This would inform the operator of where each area of dimensional concern exists. As mentioned above, in other embodiments, the light beam can be used to indicate the areas of concern or that are out of specifications.

In various further example embodiments, the measuring apparatus includes one or more digital cameras that can be employed to monitor the measurements and provide the operator additional information regarding potential problems areas. For example, the measuring apparatus can use one of the display devices to show a split screen simultaneously indicating the actual dimensional data for that exact point on the elongated part that is of concern. In such instances, this functionality can enable an operator to quickly see or spot issues with an elongated part such as a void in or a bump on the elongated part.

In another example mode of operation, the input and output devices of the measuring apparatus such as the combined input and display device 300 enables the operator to make an input that causes the optical measurer to stop at each area of dimensional concern.

It should be appreciated that for various modes of operation, the required ranges of outer diameters would be pre-loaded into the controller or otherwise accessible by the controller. This data enables the controller to make the comparisons on a real time basis of the required specifications to the actual measurements taken, and produce such appropriate indications. In various embodiments, the measuring apparatus is configured to store such specifications associated with the respective part identification (such as the part number), and thus the operator only needs to enter the part identification in the measuring apparatus.

In various such example modes of operation, the part identifications and desired measurements for each part (such as a recipe for each part number) can be pre-loaded in the measuring apparatus and accessible by an operator from a displayable menu so that the operator need not be a manager or engineer to place the elongated part on the part support and enable the measuring apparatus to do its job. In various such modes of operation, there is a designated starting point for the proximal end of each elongated part (even though the ending point may change due to the length of the elongated part).

In various modes of operation, the measurements taken of the elongated part are started from a fixed beginning point (such as a zero length point). In the illustrated example, the fixed point is at the left side of the part supporter device (although it could be at a right side of the part supporter). In other embodiments, the starting point can be at another suitable point such as in a middle or central area of the elongated transparent part supporter 130. In such embodiments, the part straightener 150 is configured to assist in positioning the elongated part along that middle or central area.

It should also be appreciated that the measuring apparatus can includes a series of additional lights controlled by the controller and mounted along or adjacent to the elongated transparent part supporter 130 and configured to indicate problem areas of the elongated part to the operator.

It should be appreciated that in various modes of operation the measuring apparatus 100 enables rapid repeatable measurements (within suitable tolerances) of the outer diameter by allowing the movable optical measurer 200 to function while essentially enabling gravity to hold the elongated part (such as a guide wire) on the elongated transparent part supporter 130 at right angles to the light generator and the light receiver. It should be noted in this regard that the elongated transparent part supporter and the optical measurer create no friction on and no movement of the elongated part (such as the guide wire). It should be noted in this regard that the elongated transparent part supporter and the optical measurer create require no manipulation during the measurement process and thus limit the damage and potential for damage to the elongated part during the measurement process.

Figure 15:
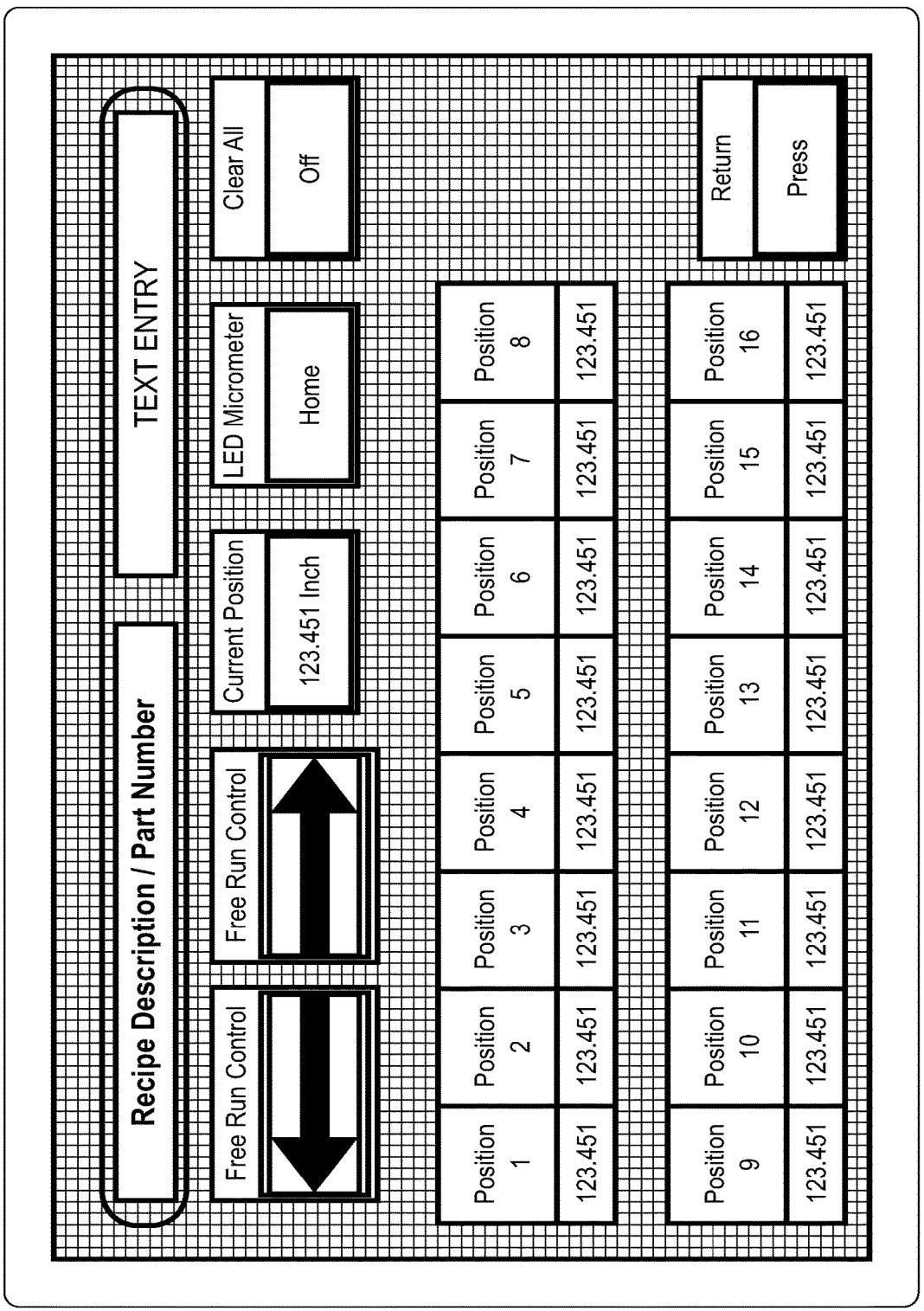
FIG. 15 is an example screen shot displayed by the display device of the measuring apparatus of FIG. 1.

Referring now to FIG. 15, one example mode of operation and example information that can be displayed by the combined input and display device 300 in that mode are generally illustrated. In this example, the combined input and display device 300 displays: (1) a recipe description and part number indicator; (2) a text entry area that is configured to show the text inputs made by the operator such as by using the keyboard; (3) an operator selectable left free run control input that enables the operator to cause the optical measurer 200 to move to the left; (4) an operator selectable right free run control input that enables the operator to cause the optical measurer 200 to move to the right; (5) a current position indicator that indicates the current position of the optical measurer 200; (6) an operator selectable home input that enables the operator to cause the optical measurer 200 to move to the home position; (7) an operator selectable clear all input that enables the operator to clear all previously selected measurement positions; (8) a series of respective position indicators (such as position indicators 1 to 16) at which the measurements have been taken and the respective measurements taken at those positions; and (9) an operator selectable home input.

In various modes of operation, the measuring apparatus enables the operator to change what type of information is displayed by using one or more control selections (not shown). It should be appreciated that any suitable type of selection, dimension measurement, or other criteria related to the coating and measurement of an elongated part (such as a guide wire) can be displayed on the combined input and display device 300. As discussed herein, this real-time data can be sent instantly or on a delayed basis to the elongated part manufacturer or other entity (anywhere in the world that's connected to a suitable data network via the Internet). Thus, in various examples, the measuring apparatus can facilitate communication with manufacturers regarding batches or lots of elongated parts with real time data provided by the measuring apparatus. For example, in various embodiments, the present disclosure contemplates that the measuring apparatus can in real time send the determined dimensional data to a customer's desired location (such as a mandrel producer) who has a dimensional problem, and to facilitate expeditious shipping and qualification of a dimensionally critical part (without having to include a printed sheet of all the dimensions).

In various embodiments, the measuring apparatus can be configured to produce one or more reports regarding the uncoated and coated elongated parts. In various modes of operation, the measuring apparatus can include or the controller can be configured to communicate with one or more printers to print one or more reports regarding the measurements taken of elongated parts. In various such embodiments, the information to be printed can be first displayed on one of the display devices and then printed for inclusion with the actual elongated parts (such as the guide wires) for the next part processing step. In various such embodiments, the report can compare the measurements before and after coating as well as the thickness of the coating.

In various embodiments, the measuring apparatus can include or be configured to operate with one or more label printers that can form a barcode label for a particular lot of elongated parts for identification of such lots.

In various modes of operation, the measuring apparatus can cause the measurement data to be stored in one or more suitable databases and/or to be documented in one or more spreadsheets or other reference documents.

In various such embodiments, each measurement (such as each increment of measurement) can be specified for any elongated part or part number.

In various modes of operation, the combined input and display device 300 is thus configured to display the dimensional measurements of each particular measured section of the elongated part. The display device 300 can also display the dimensional tolerance levels for a particular dimension of the elongated part such as the upper tolerance level and the lower tolerance level. Additionally, other operator selectable options can be displayed by the combined input and display device 300.

In various modes of operation, it should be appreciated that the display device 350 can display the outer dimensional measurements of the elongated part (such as the guide wire 50) on an instantaneous and continuous basis as the measurements of elongated part (such as the guide wire 50) are being taken by the measuring apparatus 100 (while still enabling the operator to use the combined input and display device 300 to control the measuring apparatus 100). It should be appreciated that any suitable display device may be used to display the dimension measurement data to the operator. It should also be appreciated that the measurement data can be displayed by the combined input and display device 300 and that the measuring apparatus 100 does not need to include the additional display device 350.

In various modes of operation, the optical measurer takes all of the measurements of the elongated device and then shows the operator all of the measurements and where any problem dimensional area exists. In various such embodiments, an indicator (such as a green light attached to the movable optical measurer) provides such indications during movements relevant to the elongated part on the part supporter.

In various modes of operation, any suitable dimension measurement data relating to the measured elongated part can be electronically transmitted to a designated receiver such as coater computing system or a manufacturer computing system. For instance, the dimensional data can be communicated to any remote system (anywhere around the world) on a real time or delayed (and packaged) basis. In such modes of operation, any dimensional issue can be provided to manufacturers or other interested parties on a real time or substantially real time basis. In the embodiments that include one or more digital cameras, the data from the digital cameras can also be communicated along with the dimensional data in real time or on a delayed (and packaged) basis.

It should be appreciated from that above that in various modes of operation, the method of the present disclosure of measuring a guide wire 50 includes operating the measuring apparatus 100 including the following steps: (1) positioning the guide wire 50 on the part supporter 130 with a first end of the guide wire 50 adjacent to the first end of the part supporter 130; (2) rotating the part straightener 150 from the part non-engaging position downwardly such the part engager 150 is positioned on the part supporter 130 and moving the guide wire 50 into contact with the part engager 150 to make sure the guide wire 50 on the part supporter 130 is straight or substantially straight prior to measurements; (3) rotating the part straightener 150 upwardly from the part engaging position to the part non-engaging position without substantially moving the straightened guide wire 50 on the part supporter 130; (4) receiving the desired measurements to be taken of the guide wire 50 and initiating the measurement process; (5) sequentially positioning the optical measurer 200 at each of the measurement positions, and at each measurement position causing the light generator 210 to generate a light beam that is projected (downwardly) onto the guide wire 50, through the part supporter 130 and to the light receiver 220 to measure the guide wire 50 at that position along the length of the guide wire 50; and (6) causing the combined input and display device 300 and/or display device 350 to sequentially displaying each of the measurements taken of the guide wire 50 at each of the measurement positions. This example method includes, at each measurement position causing the light generator 210 to generate a light beam that is projected (downwardly) onto the guide wire 50, through the part supporter 130, and to the light receiver 220 at that position along the length of the guide wire 50. The specific rays or portions of the light beam are blocked by the guide wire 50 while the unblocked rays or portions of the light beam are received by the light receiver 220. The method includes converting the received portions of the light beam into electrical signals and communicating the electric signal to the controller. The electrical signals indicate the distance between the unblocked portions of the light beam or the size of the dimension of the guide wire 50 at that specific position along the length of the guide wire 50. The method includes the controller receiving the signals and determines an outer dimension of the guide wire 50 based on those signals. In alternative embodiments, the optical measurer 200 actually determines the outer dimension of the guide wire 50 and sends electrical signals to the controller indicating such determined dimensions.

In various modes of operation, the optical measurer 200 measures the outer diameter of the elongated part from a first side to an opposite second side (i.e., along a first plane extending lengthwise through the elongated part). In various modes of operation, the method includes rotating the elongated part on the part supporter 130 approximately ninety degrees such that the optical measurer 200 can measure the outer diameter of the elongated part from a third side to an opposite fourth side (i.e., along a second different plane extending lengthwise through the elongated part).

In alternative embodiments of the present disclosure, the light generator and the light receiver can be alternatively configured such that the optical measurer can simultaneously measure the elongated part along multiple different axis or planes such as along two or three different lengthwise axis or planes. Such multiple axis measurements eliminate any need for certain elongated parts to be partially rotated on the part supporter for measurement.

In various such example embodiments, the light beam generated by the light generator and received by the light receiver can include multiple (such as two or three) respective sets of rays that are transverse to each other. For instance, for three sets of light rays, the first set of rays can extend downwardly at ninety degrees, the second set of rays can extend downwardly at forty-five degrees, and the third set of rays can extend downwardly at one hundred thirty-five degrees. In such case, without turning the elongated part, the light measurer can simultaneously, practically, and quickly obtain the outer dimensions of the elongated part of almost the entire outer diameter of the elongated part (or at least along three different planes extending through the elongated part).

In various other such embodiments, the light generator includes three separate sub-light generators and the light receiver includes three separate sub-light receivers. In various such embodiments, the measuring apparatus includes one or more devices in addition to the part straightener that position and/or hold the elongated part directly down the center line of the part supporter.

In various other such embodiments, this can be accomplished using a multi-axis optical measurer.

In various embodiments, the measuring apparatus of the present disclosure further includes an elongated part holding and rotating apparatus that is configure to hold and rotate the elongated part. In various such embodiments, this elongated part holding and rotating apparatus would rotate the elongated part a designated number of degrees such as ninety degrees (about it longitudinal axis) after the first group of measurements are taken for one plane extending through the elongated part to enable a second group of measurements to be taken along a transverse plane. In various such embodiments, the elongated part holding and rotating apparatus includes a suitable motor such as a servomotor configured to rotate the elongated part.

In various other such embodiments, the measuring apparatus can include a single optical micrometer and rotate the part supporter (such as the glass sections) to a desired degree to obtain two different planes of measurement of the elongated part. In certain such embodiments, suitable elongated part securing devices (such as magnetic or vacuum devices may be employed as mentioned above). In certain such embodiments, the rotation can be done in multiple different directions.

In various alternative embodiments, the measuring apparatus of the present disclosure further includes one or more elongated part holding and/or stretching devices that hold and/or stretch the elongate parts for measurement purposes.

In various embodiments, the measuring apparatus of the present disclosure further includes one or more elongated part turning or rotating devices that enable the measuring apparatus to turn or rotate the elongated part (such as by 90 degrees) so the measuring apparatus can measure the elongated part along (perpendicular) intersecting planes.

It should be appreciated from the above that the present apparatus and method significantly enhances the productivity and production rates for elongated part manufacturing lines that coat elongated parts (such as guide wires, forming mandrels, and probes) because less time is needed to take multiple measurements of the elongated parts prior to or after coating the elongated parts. Specifically, the present disclosure enables the operator to position the elongated part on the part supporter and take multiple measurements of the outer dimensions of the elongated parts without having to reposition or find a way to move or stretch the elongated part (such as a very delicate guide wire) multiple times. This saves significant amount of time, and thus expense in handling of the elongated part.

As mentioned above, it should also be appreciated that the guide wires of a batch of coated or uncoated guide wires can each be measured or can be measured using representative samples of a group, lot, or batch of the wires in accordance with the present disclosure. It should be appreciated that due to the speed and ease at which each guide wire can be measured using the measuring apparatus of the present disclosure, more representative sample guide wires or all of the guide wires of a group, lot, or batch can be quickly and easily measured.

Although not shown, other embodiments of the measuring apparatus of the present disclosure, include one or more part supporter cleaners that are configured to clean or clear away any contaminants on the part supporter 130 before the elongated part is placed on the part supporter 130 for measurement. In various example embodiments, the part supporter cleaner includes one or more compressed gas (such as air) blowers (not shown) positioned adjacent to the part supporter 130 and configured to direct pressurized dust free gas at and over the top surface of the part supporter 130 to blow off any contaminants from such top surface. In various such embodiments, the part supporter cleaners use a specified gas such as nitrogen. In various other example embodiments, the part supporter cleaner includes one or more vacuum devices configured to suck any contaminants from the top surface of the part supporter.

In the above described example embodiment and in various embodiments of the present disclosure, the elongated part (such as the guide wire 50) is manually placed on the part supporter 130 and manually removed from the part supporter 130. In other various embodiments of the present disclosure, the elongated part guide wire 50) is mechanically placed on the part supporter 130 and/or removed from the part supporter 130 such as by a suitable robotic arm or other suitable device.

It should be appreciated that the measuring apparatus of the present disclosure can be employed in a suitable clean room such as a clean room that provides a HEPA chamber or HEPA filter air chamber.

It should be appreciated that before the elongated part is placed on the part supporter and before any measurements are taken, the glass part supporter may be manually or automatically cleaned and validated. In various such embodiments, the validation can be performed by running the optical measurer with no part on the part supporter to verify that no measurable contaminants are on the glass part supporter (i.e., to make sure that all readings are 0.00).

In various embodiments of the present disclosure, as mentioned above, the measuring apparatus includes one or more sound generating devices (not shown) that may or may not be controlled by one or more sound cards. In various embodiments, the sound generating device(s) includes one or more speakers (not shown) controlled by one or more sound cards.

In various embodiments of the present disclosure, indicator lights of the measuring apparatus are separate from the other output and/or display devices, and in various embodiments the indicator lights are connected to one of the output or display devices (such as indicator lights 310 mounted on the combined input and display device 300). In either case, these indicator lights are configured to provide the operator one or more indications of the operating state of the measuring apparatus of the present disclosure and any necessary warnings.

In various embodiments of the present disclosure, the measuring apparatus includes one or more communication components such as one or more wireless communication components for facilitating communication with other devices as mentioned above.

In various embodiments of the present disclosure, the measuring apparatus includes one or more suitable power supply devices (not shown) configured to provide electric power to the various components of the measuring apparatus.

In various embodiments of the present disclosure, the measuring apparatus includes one or more control switches (such as but not limited to an on/off switch and an emergency stop switch).

In various embodiments of the present disclosure, the measuring apparatus is separate and independent of any coating system.

In various embodiments of the present disclosure, the measuring apparatus is part of a coating system that includes one or more coating apparatus.

In various embodiments of the present disclosure, the measuring apparatus is vertically disposed instead of horizontally disposed as in the illustrated example embodiment. In various such embodiments, the elongated part is hung and in various such embodiments gravity pulls the hung elongated part into a straight position. Such configurations may work with shorter elongated parts such as guide wires that are a half meter long. In various implementations, these embodiments will save floor space.

In various embodiments of the present disclosure, the measuring apparatus can be configured to move or index the elongated part relative to the optical measurer.

In various embodiments, the elongated top member or elongated part supporter can include a suitable physical measurement system (such as an etched or engraved measurement system) parallel to the position where the elongated part (such as the elongated guide wire or mandrel) will be positioned for measurement. This can enable an operator to inspect the elongated part based on a finite physical measurement from the proximal end of the elongated part on the part supporter. This enables the operator to quickly know where to look for defects and/or subsequently re-measuring them. The measurement system can employ any suitable physical markers or markings in any suitable measurement units (such as in millimeters and/or inches).

It should be appreciated from the above that the present apparatus and method provides a substantial improvement over the known measuring apparatus and methods for such flexible elongated parts (such as by holding the elongated part by one or more of the portions of the elongated part and moving the elongated part to a measurement station) which in certain instances does not account for the flexibility of the elongated part and thus provide inaccurate measurements (because the elongated part is not perfectly straight). On the other hand, as described above, the measuring apparatus and methods of the present disclosure fully account for the flexibility of the elongated part and thus provide more accurate measurements.

It should also be appreciated from the above that the present apparatus and method provides a substantial improvement over the known measuring apparatus and methods for such flexible elongated parts because during the multiple measurement process, various embodiments do not have any contact with the elongated part except the underlying glass part supporter. This enables measurement of the elongated part (i.e., top to bottom or tip to tip of the elongated part).

It should further be appreciated from the above that the present apparatus and method provides a substantial improvement over the known measuring apparatus and methods for such flexible elongated parts because even if there is any slight misalignment of the elongated part, this misalignment will not affect the measurements of the elongated part (in part because the solid state optical micrometer can take the needed measurements even with such misalignments).

It should further be appreciated from the above that the present apparatus and method provides a substantial improvement over the known measuring apparatus and methods for such flexible elongated parts because the optical micrometer provides accurate measurements from the center line axis of the elongated part.

It should further be appreciated from the above that the present apparatus and method provides a substantial improvement over the known measuring apparatus and methods for such flexible elongated parts because even small or moderate vibrations of the apparatus will not affect the measurements of the elongated part (in part because the solid state optical micrometer is not sensitive to such vibrations).

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

We claim:

1. A measuring apparatus comprising:
   a frame;
   a top member supported by the frame, the top member including a first top member and a second top member spaced apart from the first top member, and defining an elongated part supporter receiving pocket and an elongated optical measurer receipt slot;
   a transparent part supporter supported by the frame and positioned in the elongated part supporter receiving pocket; and
   a movable optical measurer movably connected to and supported by the frame and movable in the elongated optical measurer receipt slot, the movable optical measurer configured to take measurements of outer dimensions at multiple positions along a length of an elongated part positioned on the transparent part supporter.

2. The measuring apparatus of claim 1, wherein the optical measurer includes an optical micrometer.

3. The measuring apparatus of claim 1, wherein a support structure of the optical measurer is configured to move back and forth in the optical measurer receipt slot.

4. The measuring apparatus of claim 1, wherein the transparent part supporter includes a transparent glass panel formed from one or more sections of glass.

5. The measuring apparatus of claim 1, wherein the transparent part supporter defines a groove configured to receive the elongated part.

6. The measuring apparatus of claim 1, which includes a part straightener including one of a suction device and a magnet.

7. The measuring apparatus of claim 1, which includes a display device, an input device, and a controller configured to control the optical measurer, and to operate with the display device and the input device.

8. The measuring apparatus of claim 1, wherein the optical measurer includes a support structure, a light generator connected to the support structure and positioned above a top surface of the transparent part supporter, and a light receiver connected to the support structure and positioned below a bottom surface of the transparent part supporter.

9. The measuring apparatus of claim 1, which includes a movable part straightener pivotally connected to and supported by the frame.

10. The measuring apparatus of claim 9, wherein the part straightener includes: (1) a plurality of bases connected to the frame; (2) a plurality of pivot members pivotally connected to the bases; (3) a part engager; and (4) a part engager holder connected to the pivot members and connected to and supporting the part engager.

11. The measuring apparatus of claim 10, wherein the part straightener is configured to be in a part non-engaging position and configured to be in a part engaging position.

12. The measuring apparatus of claim 1, wherein the optical measurer includes a support structure, a light generator connected to the support structure and positioned on a first side of the transparent part supporter, and a light receiver connected to the support structure and positioned on a second side of the transparent part supporter.

13. The measuring apparatus of claim 12, wherein the light generator is configured to generate and emit a light beam that comprises several rays extending toward the transparent part supporter such that portions of the rays that are not blocked by the part on the transparent part supporter extend into, through, and out of the transparent part supporter and towards and to the light receiver.

14. The measuring apparatus of claim 12, wherein the movable optical measurer includes a carriage connected to the support structure and a carriage actuator assembly connected to the carriage.

15. The measuring apparatus of claim 12, wherein the light generator is positioned in a light generator housing connected to the support structure and the light receiver is positioned in a light receiver housing connected to the support structure.

16. A measuring apparatus comprising:
an elongated frame;
an elongated top member supported by the frame, the top member including an elongated first top member and an elongated second top member spaced apart from the first top member, and defining an elongated part supporter receiving pocket and an elongated optical measurer receipt slot;
an elongated transparent part supporter positioned in the part supporter receiving pocket and supported by the frame;
a movable optical measurer movably connected to and supported by the frame, the movable optical measurer including:
  (a) a support structure configured to move back and forth in the optical measurer receipt slot;
  (b) a light generator connected to the support structure and positioned on a first side of the transparent part supporter,
  (c) a light receiver connected to the support structure and positioned on a second side of the transparent part supporter,
  the light generator configured to generate and emit a light beam that comprises several rays extending toward an elongated part positioned on the transparent part supporter such that portions of the light beam rays that are not blocked by the elongated part extend into, through, and out of the transparent part supporter and towards and to the light receiver;
a display device;
an input device; and
a controller configured to control the optical measurer, and to operate with the display device and the input device.

17. The measuring apparatus of claim 16, wherein the optical measurer includes a carriage connected to the support structure and a carriage actuator assembly connected to the carriage.

18. The measuring apparatus of claim 16, wherein the light generator is positioned in a light generator housing connected to the support structure, and the light receiver is positioned in a light receiver housing connected to the support structure.

19. The measuring apparatus of claim 16, wherein the transparent part supporter includes an elongated rectangular transparent glass panel formed from one or more sections of glass.

20. The measuring apparatus of claim 16, wherein the light generator is configured to generate and emit a plurality of parallel sets of light beams that each comprise several rays extending downwardly toward the elongated part positioned on the transparent part supporter such that portions of each of the sets of light beam rays that are not blocked by the elongated part extend into, through, and out of the transparent part supporter and towards and to the light receiver.

21. The measuring apparatus of claim 16, which includes an elongated movable part straightener pivotally connected to and supported by the frame.

22. The measuring apparatus of claim 21, wherein the movable part straightener includes: (1) a plurality of bases connected to the frame; (2) a plurality of pivot members pivotally connected to the bases; (3) an elongated rubber, silicone rubber, or polymer part engager; and (4) an elongated part engager holder connected to the pivot members and connected to and supporting the part engager.

23. The measuring apparatus of claim 21, wherein the movable part straightener includes a part alignment device configured to straighten and align the elongated part at a central location along the transparent part supporter.

24. The measuring apparatus of claim 21, wherein the movable part straightener is configured to be in a part non-engaging position and configured to be in a part engaging position.

25. A measuring apparatus comprising:
a frame;

a transparent part supporter supported by the frame, the transparent part supporter defining a groove configured to receive the elongated part; and a movable optical measurer movably connected to and supported by the frame, the movable optical measurer configured to take measurements of outer dimensions at multiple positions along a length of an elongated part positioned on the transparent part supporter.

26. The measuring apparatus of claim 25, wherein the optical measurer includes an optical micrometer.

27. The measuring apparatus of claim 25, wherein the optical measurer includes a support structure, a light generator connected to the support structure and positioned on a first side of the transparent part supporter, and a light receiver connected to the support structure and positioned on a second side of the transparent part supporter.

28. The measuring apparatus of claim 25, wherein the transparent part supporter includes a transparent glass panel formed from one or more sections of glass.

29. A measuring apparatus comprising:
a frame;
a transparent part supporter supported by the frame;
a movable optical measurer movably connected to and supported by the frame, the movable optical measurer configured to take measurements of outer dimensions at multiple positions along a length of an elongated part positioned on the transparent part supporter; and
a movable part straightener pivotally connected to and supported by the frame.

30. The measuring apparatus of claim 29, wherein the optical measurer includes an optical micrometer.

31. The measuring apparatus of claim 29, wherein the optical measurer includes a support structure, a light generator connected to the support structure and positioned on a first side of the transparent part supporter, and a light receiver connected to the support structure and positioned on a second side of the transparent part supporter.

32. The measuring apparatus of claim 29, wherein the transparent part supporter includes a transparent glass panel formed from one or more sections of glass.

33. The measuring apparatus of claim 29, wherein the part straightener includes: (1) a plurality of bases connected to the frame; (2) a plurality of pivot members pivotally connected to the bases; (3) a part engager; and (4) a part engager holder connected to the pivot members and connected to and supporting the part engager.

34. The measuring apparatus of claim 29, wherein the part straightener is configured to be in a part non-engaging position and configured to be in a part engaging position.

* * * * *